(12) United States Patent
Chatterjee et al.

(10) Patent No.: US 10,383,151 B2
(45) Date of Patent: Aug. 13, 2019

(54) NARROWBAND-PHYSICAL RANDOM ACCESS CHANNEL TECHNIQUES

(71) Applicant: INTEL IP CORPORATION, Santa Clara, CA (US)

(72) Inventors: Depdeep Chatterjee, San Jose, CA (US); Gang Xiong, Portland, OR (US); Mohammad Mamunur Rashid, Hillsboro, OR (US); Tao Wu, San Jose, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/741,283

(22) PCT Filed: Dec. 23, 2015

(86) PCT No.: PCT/US2015/000165
§ 371 (c)(1),
(2) Date: Jan. 1, 2018

(87) PCT Pub. No.: WO2017/014715
PCT Pub. Date: Jan. 26, 2017

(65) Prior Publication Data
US 2018/0206271 A1 Jul. 19, 2018

Related U.S. Application Data

(60) Provisional application No. 62/193,715, filed on Jul. 17, 2015.

(51) Int. Cl.
*H04W 74/08* (2009.01)
*H04L 5/00* (2006.01)
*H04W 72/04* (2009.01)

(52) U.S. Cl.
CPC ....... *H04W 74/0833* (2013.01); *H04L 5/0053* (2013.01); *H04W 72/044* (2013.01); *H04W 72/0413* (2013.01)

(58) Field of Classification Search
None
See application file for complete search history.

(56) References Cited

U.S. PATENT DOCUMENTS

2008/0101306 A1* 5/2008 Bertrand ............. H04L 27/2613
370/336
2008/0316961 A1* 12/2008 Bertrand ............. H04W 74/004
370/329

(Continued)

OTHER PUBLICATIONS

Alcatel-Lucent, "Details of PRACH preamble coverage enhancement", R1-140152, 3GPP TSG-RAN WG1 Meeting #76, Prague, Czech Republic, Agenda Item 7.2.2.2.2, Feb. 10-14, 2014, 7 pages.

(Continued)

*Primary Examiner* — Kodzovi Acolatse
(74) *Attorney, Agent, or Firm* — Stoel Rives LLP

(57) ABSTRACT

Disclosed are narrowband (NB)-physical random access channel (PRACH) techniques for NB-long term evolution (LTE) systems supporting cellular internet of things (CIoT) and machine-type communications (MTC) deployments. Apparatus and methods are described for generating, transmitting, or receiving an NB-PRACH defined by an NB-PRACH physical structure and an NB-PRACH numerology.

26 Claims, 8 Drawing Sheets

(56) References Cited

U.S. PATENT DOCUMENTS

| | | | |
|---|---|---|---|
| 2013/0083753 A1 | 4/2013 | Lee et al. | |
| 2013/0242833 A1* | 9/2013 | Ahn | H04W 72/082 370/311 |
| 2014/0064206 A1* | 3/2014 | Bao | H04W 72/1278 370/329 |
| 2015/0146631 A1 | 5/2015 | Kim et al. | |
| 2016/0234858 A1* | 8/2016 | Bao | H04W 72/12 |
| 2017/0134881 A1* | 5/2017 | Oh | H04W 4/70 |
| 2017/0367058 A1* | 12/2017 | Pelletier | H04W 56/0045 |
| 2018/0006763 A1* | 1/2018 | Kim | H04L 1/0026 |
| 2018/0145802 A1* | 5/2018 | Hwang | H04L 5/00 |
| 2019/0013982 A1* | 1/2019 | Sun | H04L 27/2636 |
| 2019/0014548 A1* | 1/2019 | Pelletier | H04W 72/0446 |

OTHER PUBLICATIONS

Huawei, "Analysis and evaluation of PRACH coverage improvement for Low-Cost MTC UEs", R1-130887, 3GPP TSG WG1 Meeting #72bis, Chicago, USA, Agenda Item 7.2.4.3, Apr. 15-19, 2013, 7 pages.

Nokia, "LTE-M-Optimizing LTE for the Internet of Things", White Paper—http://networks.nokia.com/sites/default/files/document/nokia_lte-m_-_optimizing_lte_for_the_internet_of_things_white_paper.pdf, May 1, 2015, 16 pages.

PCT/US2015/000165, International Search Report and Written Opinion, dated Mar. 24, 2016, 16 pages.

Qualcomm Incorporated, "Narrow Band OFDMA—Support of Large Cells", Tdoc GPC150069, 3GPP TSG GERAN Cellular IoT Ad Hoc, Agenda Item 1.4.3, 2.4.4, Feb. 2-5, 2015, 5 pages.

\* cited by examiner

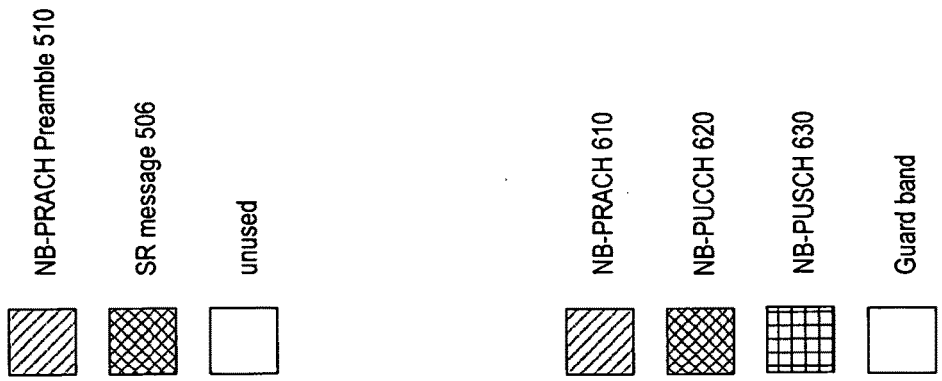
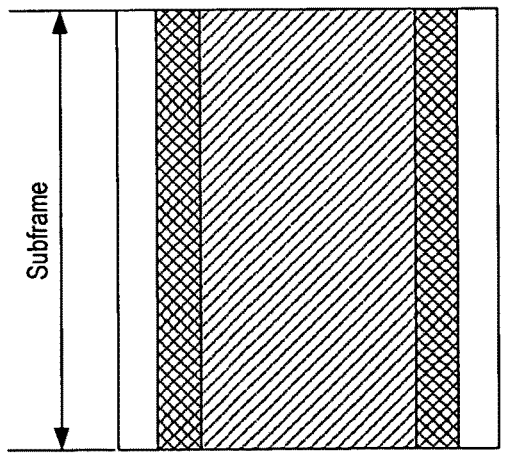
FIG. 5
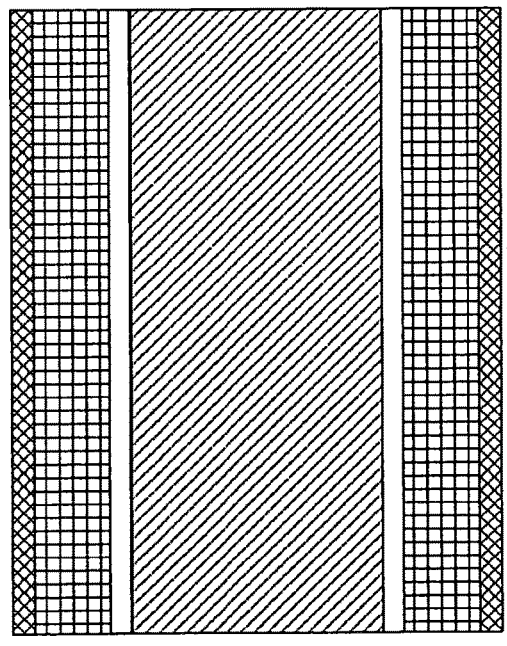
FIG. 6

Table 1. Numerology for NB-PRACH

| Option | Subcarrier spacing (kHz) | Preamble seq. duration, $T_{seq}$ (us) | Total subcarriers within 180 kHz | Preamble seq. length (Nzc) | Guard band (each side) (kHz) | CP length* (us) | Guard time* (us) | Maximum cell radius (km) |
|---|---|---|---|---|---|---|---|---|
| 1 | 3.0 | 333.33 | 60 | 59 | 1.5 | 338.55 | 328.12 | ~47 |
| 2 | 2.5 | 400 | 72 | 67/ 71 | 6.25/ 1.25 | 303.13 | 296.88 | ~44 |
| 3 | 1.875 | 533.36 | 96 | 89 | 6.5625 | 237.45 | 229.19 | ~34 |
| 4 | 1.5 | 666.67 | 120 | 113 | 5.25 | 171.87 | 161.46 | ~24 |
| 5 | 1.25 | 800 | 144 | 139/ 137/ 131/ 113 | 3.125/ 4.375/ 8.125/ 15.625 | 103.13 | 96.88 | ~14 |

FIG. 7

Table 2. Options with smaller subcarrier spacing ( < 1.25 kHz)

| Option | Subcarrier spacing (Hz) | Preamble seq. duration, $T_{seq}$ (us) | Total subcarriers within 180 kHz | Preamble seq. length (Nzc) | Guard band (each side) (kHz) | CP length* (us) | Guard time* (us) | Total NB-PRACH duration (ms) | Maximum cell radius (km) |
|---|---|---|---|---|---|---|---|---|---|
| 1 | 625 | 1600 | 288 | 281, 271, 257, 239 | 2.19, 5.31, 9.68, 15.3 | 206.25 | 193.75 | 2 | ~30 |
| 2 | 416.66 | 2400 | 432 | 419, 401, 383, 359 | 2.3, 6.46, 10.2, 15.2 | 309.53 | 290.47 | 3 | ~45 |
| 3 | 312.5 | 3200 | 576 | 563, 541, 509, 479 | 2.04, 5.47, 10.47, 15.16 | 409.37 | 390.63 | 4 | ~60 |
| 4 | 208.33 | 4800 | 864 | 839, 809, 761, 719 | 2.5, 5.73, 10.73, 15.1 | 610.32 | 589.68 | 6 | ~90 |

FIG. 8

NARROWBAND-PHYSICAL RANDOM ACCESS CHANNEL TECHNIQUES

RELATED APPLICATION

This application is a national stage filing under 35 U.S.C. § 371 of International Patent Application No. PCT/US2015/000165, filed Dec. 23, 2015, which claims the benefit of U.S. Provisional Patent Application No. 62/193,715, filed Jul. 17, 2015, each of which is hereby incorporated by reference herein in its entirety.

TECHNICAL FIELD

The present disclosure relates generally to wireless networks and, more particularly, to $3^{rd}$ Generation Partnership Project (3GPP) radio access networking techniques.

BACKGROUND INFORMATION

Machine-type communications (MTC) technology has been a subject of a work item (WI) for long term evolution (LTE) standardization efforts for support of massive MTC and cellular internet of things (CIoT) deployments. CIoT or MTC devices have very low device complexity, are latency-tolerant, are low throughput and have very low power consumption. As such, they are seen as promising technology for next-generation cellular wireless networks.

BRIEF DESCRIPTION OF THE DRAWINGS

FIG. 5 is a time and frequency diagram showing frequency-division multiplexing (FDM) of an NB-PRACH with an SR within a single NB bandwidth and subframe resource allocation.

FIG. 6 is a time and frequency diagram showing FDM of an NB-PRACH with an NB-physical uplink shared channel (PUSCH) and/or NB-physical uplink control channel (PUCCH) in system bandwidth of various sizes.

FIG. 7 is a Table 1 showing options for NB-PRACH numerology, according subcarrier spacing in a range from 1.25 kHz to 3.0 kHz.

FIG. 8 is a Table 2 showing options for NB-PRACH numerology, according subcarrier spacing in a range from 208.33 Hz to 625 Hz.

DETAILED DESCRIPTION OF EMBODIMENTS

Aspects and advantages will be apparent from the following detailed description of embodiments, which proceeds with reference to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claims. However, it will be apparent to those skilled in the art having the benefit of the present disclosure that the various aspects of the claims may be practiced in other examples that depart from these specific details. In certain instances, descriptions of well-known devices, circuits, and methods are omitted so as not to obscure the description of pertinent details.

Figure 1:
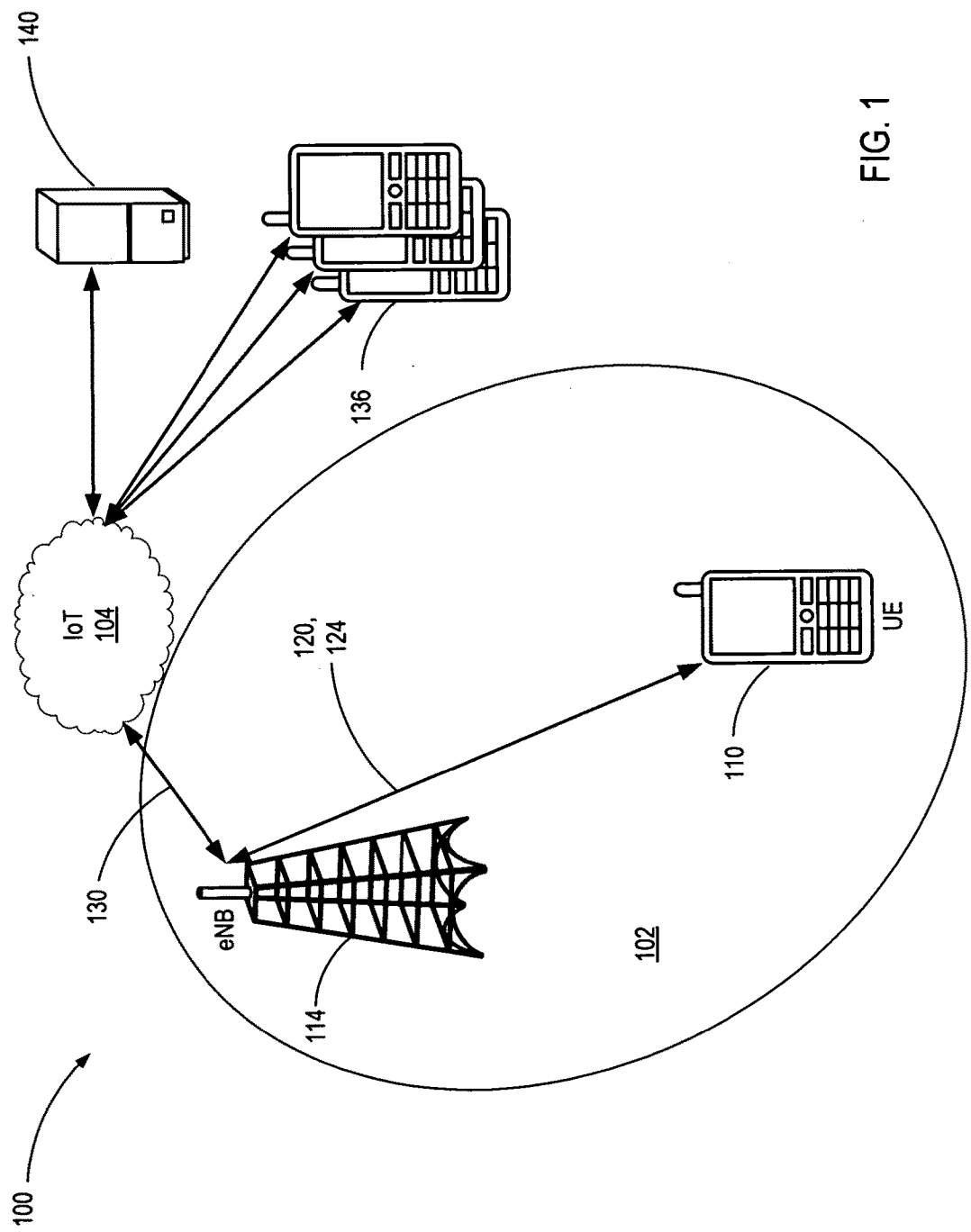
FIG. 1 is a block diagram of a user equipment (UE) embodied as CIoT device accessing an IoT network through a wireless communication link provided by an evolved node B (eNB) in a long term evolution (LTE) network.

FIG. 1 shows a CIoT system 100 for facilitating MTC transmissions between an LTE system 102 and an IoT network 104. When a UE 110 powers on, it first determines time and frequency parameters of an evolved universal terrestrial radio access network (E-UTRAN) Node B (also known as an Evolved Node B, abbreviated as eNodeB or eNB) 114 in the LTE system 102 to enable the UE 110 to demodulate downlink (DL) signals 120 and transmit uplink (UL) signals 124 when desired. The time and frequency parameters facilitate symbol and frame timing determination, carrier frequency error estimation, and physical cell ID acquisition. Upon successful synchronization and cell search, the UE 110 may then attempt to perform a random access by transmission of a physical random access channel (PRACH) to thereby establish uplink 124 and a network link 130 to the IoT network 104. The link 130 connectivity provides for MTC transmissions between IoT devices 136 and various other devices, such as application server 140 or monitoring devices.

Designs of CIoT systems can be based on an evolution of the 3GPP LTE-Advanced features, like those of release 13 of the LTE standardization effort. For example, such designs may support low complexity MTC devices (termed as category M devices) in a bandwidth of 1.4 megahertz (MHz) on the DL and UL at both radio frequency (RF) and baseband, irrespective of the system bandwidth. But other CIoT devices may be supported on narrowband (NB)-LTE systems, and operate at 200 kilohertz (kHz) bandwidth for both DL and UL, or just the UL, at both RF and baseband stages.

Figure 2:
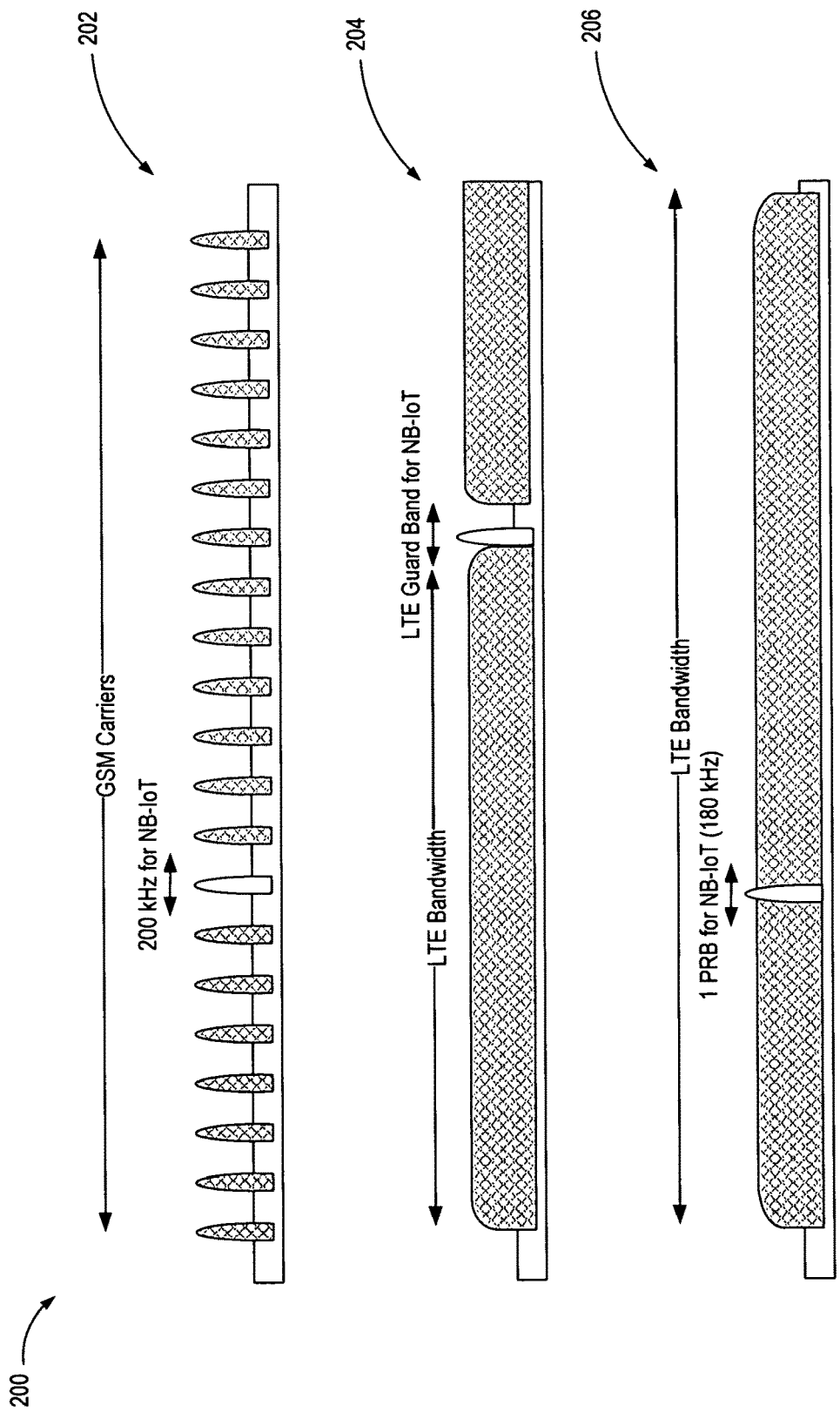
FIG. 2 is a group of spectrum diagrams showing three examples of narrowband frequency bands located within wider-band wireless systems for use by cellular IoT devices.

FIG. 2 shows an example of such an NB-LTE system—also referred to as an NB-IoT system—having 180 kHz or 200 kHz bandwidth. FIG. 2 shows three example spectrum diagrams 200 for locations of such a downlink transmission bandwidth. Example 202 shows a non-LTE spectrum allocation for MTC service as a stand-alone deployment on repurposed global system for mobile communications (GSM) spectrum band. Examples 204 and 206 show bandwidth allocations, respectively, between and within an existing LTE band (e.g., coexisting with legacy LTE UEs). In particular, example 206 shows use of one physical resource block (PRB).

Following legacy LTE design principles, such NB-LTE systems can use an orthogonal frequency-division multiple access (OFDMA)-based multiple access mechanism in the DL and a single carrier-frequency-division multiple access (SC-FDMA)-based design in the UL. (SC-FDMA is also known as discrete Fourier transform-spread-OFDMA or DFT-S-OFDMA.) In some other embodiments, such NB systems for CIoT devices can be designed as a new radio access technology (RAT), e.g., following a clean slate approach, to support CIoT devices on the aforementioned bands.

Note that the PRACH specified as per 3GPP LTE-Advanced specifications would not be suitable for NB-LTE design since the legacy LTE PRACH occupies a bandwidth of 1.08 MHz. Accordingly, disclosed are design options for an NB-PRACH that is limited to a bandwidth range from about 180 kHz (equivalent to that of one LTE PRB) to about 200 kHz—specifically, options for NB-PRACH for NB-LTE and CIoT devices including: physical structure, numerology, and sequences for NB-PRACH; NB-PRACH procedure details including options for joint PRACH and SR messages (also referred to as simply SR) for mobile originated traffic and support of enhanced coverage with NB-PRACH; resource allocation for NB-PRACH; and NB-PRACH configuration.

Physical Structure of NB-PRACH

The following design options are for the physical structure and sequences of an NB-PRACH and assume use of a DFT-S-OFDMA-based UL design. As mentioned previously, the NB-PRACH physical structure should accommodate a bandwidth of no more than 180 kHz so that the NB-PRACH will fit within a single LTE PRB. But in the time domain, the NB-PRACH might occupy one or multiple legacy LTE transmission time intervals (TTIs) of one millisecond (ms) each, according to some design options.

Figure 3:
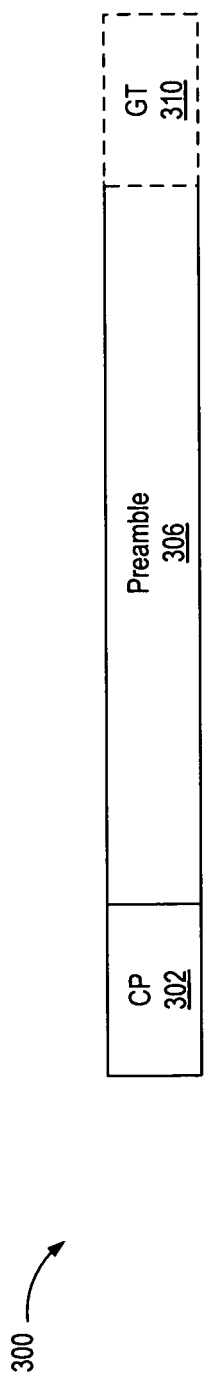
FIG. 3 is a block diagram showing a narrowband (NB)-physical random access channel (PRACH) physical layer structure.

FIG. 3 illustrates an NB-PRACH physical structure 300. The physical structure 300 includes a cyclic prefix (CP) 302, an NB-PRACH preamble sequence 306 (also referred to simply as a preamble or sequence), and an optional guard time (GT) 310 at the end. The physical structure 300 may have a similar arrangement of components to that of a larger-bandwidth LTE PRACH physical structure, but the components 302, 306, and 310 are tailored for use in the NB deployments.

In another embodiment, a physical structure for NB-PRACH can also include transmission of coded bits (i.e., a payload of data) that can carry information related to an SR requesting UL resources for mobile originated traffic.

Figure 4:
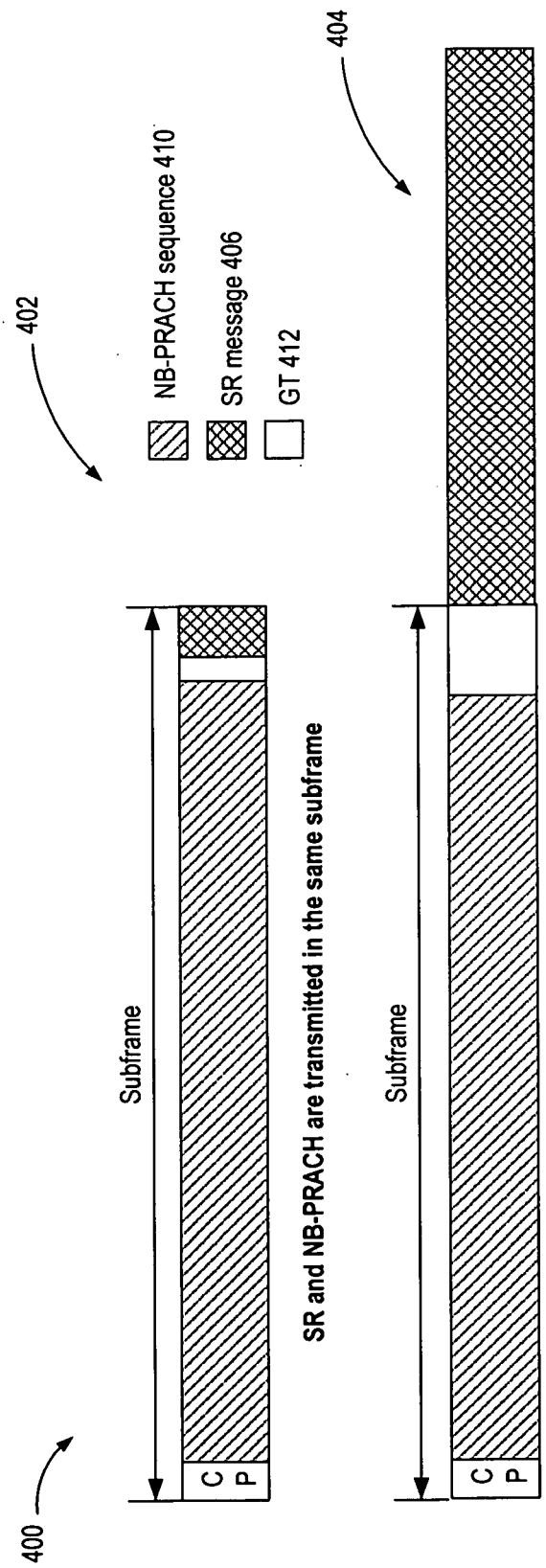
FIG. 4 is a time and frequency diagram showing time-division multiplexing (TDM) of an NB-PRACH and scheduling request (SR).

For example, FIG. 4 shows, in the time dimension, a first option 402 and a second option 404 for providing an SR 406. The first option 402 shows the SR 406 transmitted with an NB-PRACH sequence 410 in a single subframe, whereas the second option 404 shows the SR 406 and the NB-PRACH sequence 410 transmitted in separate subframes.

Both of the first option 402 and the second option 404 show the SR 406 following a GT 412. As a variant of the two options, an SR can be transmitted between the NB-PRACH sequence 410 and the GT 412. For the second option 404, this implies that coded bits of the SR 406 are mapped to resource elements (REs) spanning from a first subframe into a second subframe. Furthermore, depending on the SR 406 message size, multiple SR transmission opportunities can be defined within one subframe. SR (transmission) opportunities are combinations and subcombinations of one or more resources in time, frequency, or code domain for SR transmission.

A UE may randomly select one NB-PRACH preamble signature and an SR opportunity for the transmission of an NB-PRACH and SR message. To allow an eNB to identify the UE identifier and corresponding buffer status report (BSR), a one-to-one mapping between NB-PRACH preamble signature and SR opportunity can be defined. In other words, each NB-PRACH preamble signature has a defined SR opportunity, and vice versa.

In some embodiments, the NB-PRACH bandwidth can be further reduced (e.g., from 180 kHz to 90 kHz). In such cases, there may be additional subcarrier resources available for transmission of an SR simultaneously with the NB-PRACH. The SR, therefore, may be advantageously transmitted using an NB-PUSCH or an NB-PUCCH format. For example, FIG. 5 shows a subframe 500 including frequency-division multiplexing (FDM) use of NB-PUSCH or NB-PUCCH formats for simultaneous transmission of an SR 506 with an NB-PRACH (preamble) 510. In other words, FIG. 5 is showing a possible FDM scheme for transmission of a preamble part and a data (i.e., coded bits) part in an NB-PRACH design. Note that CP length for the transmission of NB-PRACH can be different from that used for the transmission of NB-PUSCH or NB-PUCCH.

The FDM option may also be suited for cases in which the subcarrier spacing in the subframe having the NB-PRACH transmission is set to a smaller value (e.g., 2.5 kHz) than it is in legacy LTE systems (e.g., 15 kHz). Also, for FDM options, subcarrier spacing for both the NB-PRACH itself and the NB-PUSCH or NB-PUCCH that carries the SR information should be the same in order to enable use of a single DFT precoding operation in time. Additional details of the considerations for subcarrier spacing for NB-PRACH are discussed in the following paragraphs.

Numerology Options for NB-PRACH

In some embodiments, the numerology options for NB-PRACH are determined such that the NB-PRACH transmission, including at least the CP and GT, is aligned with the boundaries of the 1-ms-long LTE subframe duration.

The subcarrier spacing for NB-PRACH can be different from that used for other UL transmissions in NB-LTE, such as for NB-PUSCH or NB-PUCCH transmissions. A smaller subcarrier spacing leads to larger symbol time for NB-PRACH, thereby providing sufficient NB-PRACH sequence duration to address desired coverage areas and to absorb the maximum round-trip delay (RTD). However, the subcarrier spacing may be sufficiently wide (i.e., not extremely small) to avoid implementation challenges like sensitivity to Doppler spread, frequency offsets, or other challenges. Hence, assuming the desire to support mobility speeds of up to 30 kilometers per hour (km/hr) and a two gigahertz (GHz) carrier frequency, the subcarrier spacing for NB-PRACH can be lower-bounded by 1.2 kHz to avoid inter-carrier interference (ICI), such that the subcarrier spacing is greater than about 20 times the maximum Doppler frequency.

As mentioned previously, if the NB-PRACH bandwidth is less than 180 kHz, NB-PRACH can be multiplexed with NB-PUSCH or NB-PUCCH in the FDM manner. FIG. 6, however, illustrates a multiplexing scheme 600 for transmitting from a UE an NB-PRACH 610 (having an NB bandwidth allocation of about 200 kHz or less) so that it may received at an eNB with other UL physical channels in a (potentially larger) system bandwidth (e.g., 1.4 MHz) 616. Note that although in FIG. 6, an NB-PUCCH 620 is transmitted in the edge of the system bandwidth 616, other resource allocation schemes can be readily understood from this example. Further, NB-PUCCH 620, an NB-PUSCH 630, and/or larger bandwidth variants thereof (i.e., a legacy PUCCH or PUSCH) may be multiplexed with the NB-PRACH 610 within system bandwidth 616 to optionally fit within the NB bandwidth allocation (e.g., about 200 or 180 kHz). In another embodiment, the multiplexing supports providing the NB-PRACH 610 in an NB allocation and legacy PUCCH or PUSCH are provided from a larger-bandwidth system allocation (e.g., to facilitate coexistence with legacy LTE systems).

The NB-PRACH sequence design can be based on Zadoff-Chu (ZC) sequences due to their optimal auto- and cross-correlation properties. The latter property can be realized with the maximal number of possible sequences by selecting a prime-length sequence; i.e., $N_{ZC}$ is a prime number. Following the above-mentioned consideration of minimum subcarrier spacing for NB-PRACH of 1.2 kHz, the preamble sequence length can be expected to be no more than 144.

Considering coexistence within an existing LTE system bandwidth, it is beneficial to maintain an integer factor between subcarrier spacing values for NB-PRACH and NB-PUSCH and legacy PUSCH to minimize interference in frequency. As an aside, legacy PUSCH is carried with 15 kHz subcarrier spacing, whereas NB-PUSCH may have smaller subcarrier spacing, e.g., 3.75 kHz, 2.5 kHz, or other spacing.

Additionally, guard bands at the edges of the NB-PRACH may be included to minimize the interference to the edge subcarriers of the NB-PRACH transmission from other UL transmissions in the adjoining PRBs when the NB-LTE system is deployed within or adjacent to the LTE system bandwidth. Assuming a maximum UE transmission power of 23 decibel-milliwatts (dBm), it can be seen that the impact from transmission of UL physical channels and signals on adjacent PRBs can be significantly less than that for legacy LTE PRACH (that spans 864 subcarriers). Hence, the required size of the guard bands for NB-PRACH can be expected to be smaller than that for legacy LTE PRACH.

As mentioned above, in relation to NB-PRACH subcarrier spacing, the NB-PRACH sequence duration ($T_{SEQ}$) should be at least longer than the sum of the RTD corresponding to the maximum cell radius (usually considered at 100 km for LTE deployments) and the target maximum delay spread (DS). Similar to the consideration of the RTD for the NB-PRACH sequence duration, the CP and the GT are designed sufficiently long to cover the RTD. Also, at least one of them, usually the CP, should additionally accommodate the maximum delay spread of the channel to be supported. Thus, for an NB-PRACH spanning X microseconds (µs) (e.g., X=1,000 when the NB-PRACH will fit within 1 ms), the durations for the constituent parts of the NB-PRACH (assuming a sequence-only NB-PRACH) should satisfy the following equation:

CP_length+$T_{SEQ}$+GT_duration=X, where $T_{SEQ}$ is the duration of the NB-PRACH sequence.

In terms of the RTD value, the above relationship should satisfy the following expression:

RTD+DS+$T_{SEQ}$+RTD·CP_length+$T_{SEQ}$+GT_duration=X, where DS is the maximum delay spread that the NB-PRACH is designed to support. A maximum value of 6.25 µs (similar to LTE) is assumed in this work.

Also note that, in the above, perfect or near-perfect DL synchronization (~0.5 µs) is assumed. However, DL timing accuracy may be relaxed for devices operating in an NB-LTE system. This is so because DL time synchronization based on narrowband DL synchronization signals and reference signals may be less accurate than that of legacy LTE systems with wider synchronization (spanning 1.08 MHz) and reference signals (e.g., wideband CRS). Thus, the CP or the GT of the NB-PRACH should be appropriately dimensioned to accommodate the possible uncertainty due to the DL timing accuracy error.

The approximate maximum cell radius covered by the NB-PRACH is given by the following expression:

$R$max=min($R$max_SEQ,$R$max_GT), where Rmax_SEQ is the maximum distance supported by the preamble sequence duration and Rmax_GT is the maximum distance supported by the GT (and CP) durations.

Considering the above terms and design principles, and assuming that the NB-PRACH is limited to 1 ms in duration, different options for NB-PRACH numerology and physical structure 700 are provided in Table 1 of FIG. 7. The options depend on a choice of the subcarrier spacing for NB-PRACH. Note that in Table 1, the exact CP length and guard time values may be slightly different if a maximum delay spread (DS) has a value different from 6.25 µs (which is assumed for the calculations for Table 1).

It can be expected that the subcarrier spacing for other UL physical channels and signals for NB-LTE could be reduced from the 15 kHz value in LTE to a smaller value, e.g., 2.5 kHz. Hence, for UL transmissions for NB-LTE, a CIoT device uses a fast-Fourier transform (FFT) engine of size 128 if the subcarrier spacing is between 1.5 kHz and 2.5 kHz. In this regard, all the options of Table 1, except option 5, can be realized by a size 128 FFT engine at the UE transmitter. This can be useful in reducing UE complexity since a single FFT engine can be used for NB-PRACH and other UL physical channels.

Although the minimum subcarrier spacing for NB-PRACH considered in Table 1 was 1.25 kHz, a much smaller subcarrier spacing may be adopted in some cases. For example, smaller subcarrier spacing may be adopted in case of IoT networks supporting predominantly stationary IoT devices or when sensitivity to Doppler spread or frequency offsets can be addressed. Some example design options including smaller subcarrier spacing for NB-PRACH numerology and physical structure 800 are listed in Table 2 of FIG. 8. Note that option 1 of Table 2 assumes maximum delay spread (DS) of 6.25 µs, but options 2, 3, and 4 assume 16.67 µs to account for larger cell sizes. However, options 2-4 can also be straightforwardly adjusted to accommodate a different value of DS (e.g., 5.2 µs).

If the subcarrier spacing is reduced to 208.33 Hz (i.e., by a factor of six compared to legacy PRACH subcarrier spacing), the reduction would enable the same number of subcarriers (864) and hence, support the same NB-PRACH preamble sequence length of 839 as in legacy LTE PRACH. However, this implies that the NB-PRACH preamble duration would be 4.8 ms, and the entire NB-PRACH transmission (including CP and GT) would span 6 ms. This NB-PRACH design would support guard bands of 2.6 kHz at both edges, and it may be easier to support the simultaneous transmission of NB-PRACH and SR using FDM. Further, if the subcarrier spacing is set to 2.5 kHz for other NB-LTE UL physical channels and signals, then such a design would lead to a common value of the TTI and the NB-PRACH duration of 6 ms.

Repetitions and Longer Formats for NB-PRACH

Figure 9:
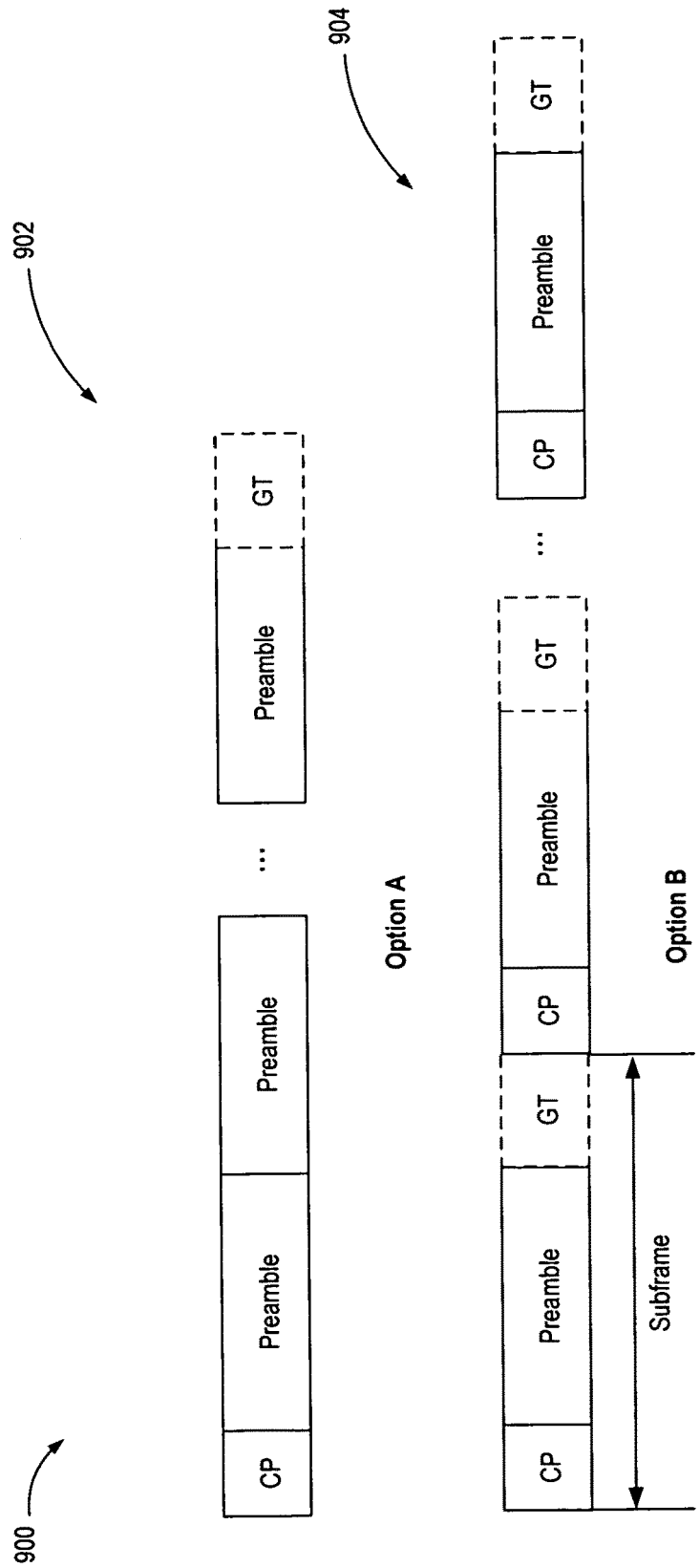
FIG. 9 is a pair of block diagrams showing options for repeated NB-PRACH transmission to improve coverage.

FIG. 9 shows options 900 for repeating an NB-PRACH preamble. To facilitate improved detection performance of NB-PRACH, including consideration of coverage enhancements for links with poor signal-to-noise ratio (SNR) or to support a larger cell radius, the symbol carrying the NB-PRACH preamble sequence can be repeated in time to define additional NB-PRACH formats (as is done in the case of legacy PRACH format number 2, which is based on legacy PRACH format zero), as is shown by an NB-PRACH structure 902 of option A in FIG. 9. Note that for such repeated NB-PRACH preambles, the total extent of the NB-PRACH would also be extended to span integer multiples of 1 ms. Further, the CP and GT lengths would also be increased compared to the basic NB-PRACH format that can be accommodated within 1 ms.

As another option, a basic NB-PRACH format can be repeated in order to support enhanced coverage operation, as illustrated by an NB-PRACH structure 904 of option B in FIG. 9. Depending on the enhanced coverage level or the coverage class, different UEs may use different repetition levels for the NB-PRACH transmission. In order to support a large user capacity, the repeated transmissions of the NB-PRACH can be transmitted with application of a cover code, e.g., spreading using an orthogonal cover code (OCC). As an example, every four repetitions of the NB-PRACH can be transmitted with an OCC of length four, thereby further increasing fourfold the NB-PRACH user capacity.

Further, upon failure to successfully receive a random access response (RAR) from the eNodeB in response to the NB-PRACH transmission after a certain number of attempts at a first NB-PRACH repetition level, the UE may transmit using a second (higher) NB-PRACH repetition level. The NB-PRACH resources for different repetition levels or coverage classes can be separated either based on time-division multiplexing (TDM), code-division multiplexing (CDM), or FDM. For example, for TDM, different time resources, such as one or multiple subframes, may be allocated for NB-PRACH transmissions from UEs in different coverage classes or repetition levels. For CDM, different NB-PRACH preambles may be reserved for each coverage class or repetition level. And for FDM, there may be different 180 kHz narrowbands (or portions within a single narrowband if the NB-PRACH bandwidth is less than 180 kHz, e.g., 90 kHz) allocated.

In some embodiments, use of maximum transmission power for all NB-PRACH transmissions is contemplated. In other embodiments, a power ramping mechanism may dynamically change transmit power based on a number of repetitions of an NB-PRACH preamble. For example, assume two repetition levels: R1 and R2, where R1 and R2 represent different numbers of repetitions of an NB-PRACH preamble, and where R2>R1. Accordingly, the transmission power used to transmit an NB-PRACH at repetition level R1 may be reduced by a factor of $10*\log(R2/R1)$ when using the repetition level R2. Such a power ramping mechanism may be selected by a UE as defined in a specification, or it may be configured by an eNB and indicated as part of the NB-PRACH configuration signaling though NB-LTE system information blocks (NB-SIBs). Note that factoring in the increase in the number of repetitions at each NB-PRACH repetition level may imply a reduction of the starting power level (i.e., the power level for the first attempt at a particular repetition level compared to that for the previous repetition level) by an amount that is a function of the increase in the number of repetitions.

Cyclic Shifts for NB-PRACH Preamble Sequence

Cyclic time shifts of the ZC-based root sequence are configured in a cell to support CDM-based user multiplexing due to the ideally zero cross-correlation property between cyclically time-shifted copies of a ZC sequence. With the change in the NB-PRACH preamble sequence length ($N_{ZC}$) and potentially also the duration, the configuration of the cyclic shifts for NB-PRACH may be adapted from the options currently specified for legacy PRACH. In general, if $N_{ZC}$ is reduced from 839 for NB-PRACH, then the supported values of the minimum cyclic shift distance, $N_{CS}$, would also be reduced accordingly. For a given target coverage area (cell radius), the minimum distance between cyclic time shifts of a root sequence should be sufficient to accommodate the timing uncertainty at the NB-PRACH at the eNodeB receiver, the target maximum delay spread for the cell, and additional guard samples to accommodate any spillover of the receiver pulse shaping filter. Hence, for a target cell radius R, the minimum $N_{CS}$ value can be given by the following expression:

$$N_{CS} \geq \text{ceil}((2*R/c+DS)*(N_{ZC}/T_{SEQ}))g_s,$$

where R, c, DS, $N_{ZC}$, $T_{SEQ}$, and $g_s$ are, respectively, the target cell radius, speed of light, target maximum delay spread, NB-PRACH sequence length, NB-PRACH sequence duration, and additional guard samples.

Configuration of NB-PRACH

After initial cell synchronization process is completed, UE will read master information block in the DL, which contains important information regarding downlink cell bandwidth, PHICH configuration and system frame number. Then the UE can read system information block 1 (SIB1) and system information block 2 (SIB2) to obtain useful information related to cell access, SIB scheduling and radio resource configuration. SIB2 carries radio resource configuration information common for all UEs, such as RACH related parameters, PUCCH, and PUSCH configurations. The configuration of NB-PRACH resources can be defined similar to legacy PRACH configuration (i.e., by SIB2 PRACH), but with new definitions for the NB-PRACH configuration index to correspond to new time-domain NB-PRACH opportunities. For example, NB-PRACH resources can be defined similar to a legacy LTE PRACH configuration using the PRACH configuration tables defined in 3GPP technical specification (TS) 36.211 V12.6.0 (2015-06) for LTE PRACH, but with modifications to the entries in the table to indicate new time-domain NB-PRACH opportunities. A smaller range of the NB-PRACH configuration index and, thereby, a reduced length of the NB-PRACH Configuration index of about two to four bits can be introduced (compared to the current PRACH configuration index of six bits) to reduce signaling overhead. According to current specifications, the code-points corresponding to the PRACH configuration indices correspond to different PRACH preamble formats as well as the subframes in which they may be transmitted. For NB-PRACH, the code-points of the NB-PRACH configuration index can indicate the NB-PRACH preamble format, if more than one NB-PRACH preamble format is defined, and the time resources available for NB-PRACH transmission, with the latter being more infrequent compared to legacy PRACH subframes.

Assuming that the subcarrier spacing in the DL is maintained at 15 kHz and for the UL it is changed to 2.5 kHz, the indication of the time resources can be defined using a combination of indices to UL subframes (e.g., even or odd or every N-th UL subframe) and the NB-system frame number (NB-SFN), wherein the NB-SFN can be defined to span 60 ms, i.e., 60 DL subframes (with each DL subframe spanning 1 ms TTI) instead of 10 ms (in legacy LTE). Note that for this case, each UL subframe would span 6 ms. In other words, for LTE PRACH, the PRACH time resources are indicated using the system frame number (SFN) and the subframe number. But for NB-PRACH, the time-domain resource indexing can be done using a combination of the NB-SFN (which could be an integer multiple of $10*f$, where f is an integer multiple of 15 kHz DL spacing/SC_spacing, and where SC_spacing equals 2.5 kHz, 3.75 kHz, other suitable value) and UL subframe indices within the NB-SFN duration.

Example Devices and Components

As used herein, the term "circuitry" may refer to, be part of, or include an application specific integrated circuit (ASIC), an electronic circuit, a processor (shared, dedicated, or group), and/or memory (shared, dedicated, or group) that executes one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 10:
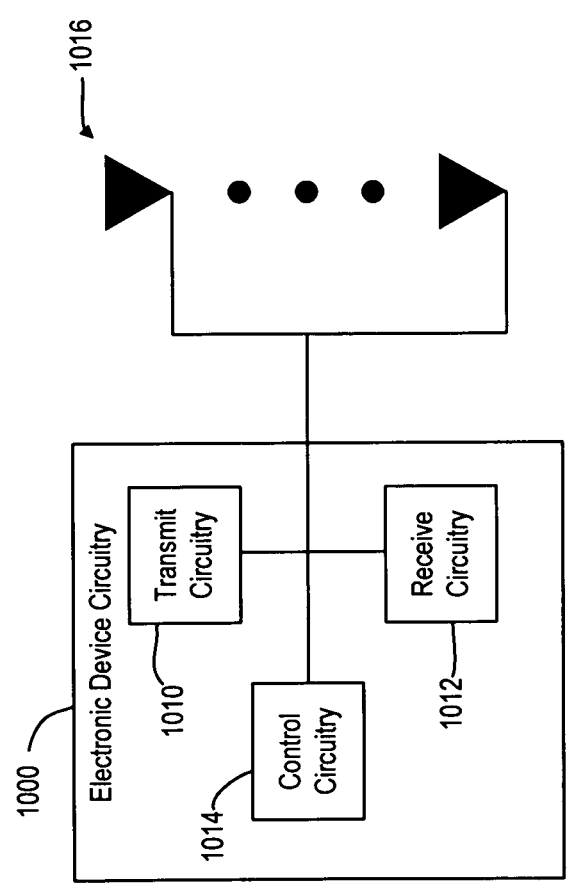
FIG. 10 is a block diagram of electronic device circuitry.

FIG. 10 is a block diagram illustrating electronic device circuitry 1000 that may be eNB circuitry, UE circuitry, network node circuitry, or some other type of circuitry in accordance with various embodiments. In embodiments, the electronic device circuitry 1000 may be, or may be incorporated into or otherwise a part of, an eNB, a UE, a network node, or some other type of electronic device. In embodiments, the electronic device circuitry 1000 may include radio transmit circuitry 1010 and receive circuitry 1012 coupled to control circuitry 1014. In embodiments, the transmit circuitry 1010 and/or receive circuitry 1012 may be elements or modules of transceiver circuitry, as shown. The electronic device circuitry 1010 may be coupled with one or more of a plurality of antenna elements 1016 of one or more antennas. The electronic device circuitry 1000 and/or the components of the electronic device circuitry 1000 may be configured to perform operations similar to those described elsewhere in this disclosure.

In embodiments where the electronic device circuitry 1000 is a UE, or is incorporated into or otherwise part of a UE, the UE is configured to use an NB bandwidth when performing random access of a cellular network associated with an eNB. The eNB is configured to provide the NB bandwidth at a frequency band of a repurposed deployment using global systems for mobile communications (GSM) spectrum, an in-band deployment using a physical resource block (PRB) of a larger-bandwidth LTE system, or a guard-band deployment using a guard band of the larger-bandwidth LTE system. Thus, the control circuitry may be configured to generate an NB-PRACH defined by an NB-PRACH physical structure and an NB-PRACH numerology; the NB-PRACH physical structure including a cyclic prefix (CP), a guard time (GT), and an NB-PRACH sequence between the CP and the GT; and the NB-PRACH numerology configured to size components of the NB-PRACH physical structure such that a beginning of the CP and an end of the GT temporally correspond with a beginning and an end of one or more LTE subframes that each has a 1 ms duration, and the NB-PRACH numerology configured to maintain a number of subcarriers at a subcarrier spacing to establish the NB-PRACH as having an NB-PRACH bandwidth within the NB bandwidth.

Figure 11:
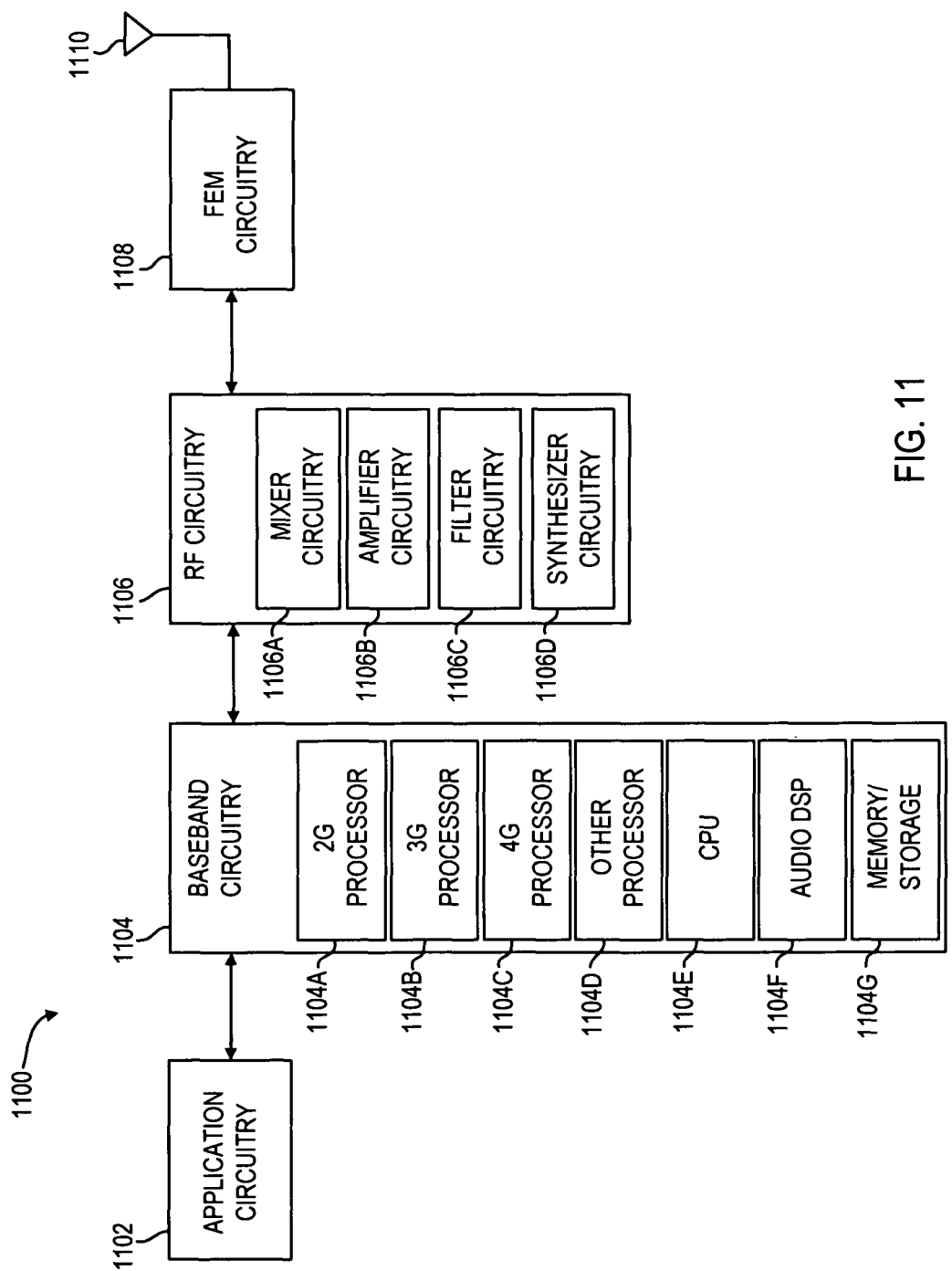
FIG. 11 is a block diagram of a UE.

Embodiments described herein may be implemented into a system using any suitably configured hardware and/or software. FIG. 11 is a block diagram illustrating, for one embodiment, example components of a user equipment (UE) device 1100. In some embodiments, the UE device 1100 may include application circuitry 1102, baseband circuitry 1104, radio frequency (RF) circuitry 1106, front-end module (FEM) circuitry 1108, and one or more antennas 1110, coupled together at least as shown in FIG. 11.

The application circuitry 1102 may include one or more application processors. By way of non-limiting example, the application circuitry 1102 may include one or more single-core or multi-core processors. The processor(s) may include any combination of general-purpose processors and dedicated processors (e.g., graphics processors, application processors, etc.). The processor(s) may be operably coupled and/or include memory/storage, and may be configured to execute instructions stored in the memory/storage to enable various applications and/or operating systems to run on the system.

By way of non-limiting example, the baseband circuitry 1104 may include one or more single-core or multi-core processors. The baseband circuitry 104 may include one or more baseband processors and/or control logic. The baseband circuitry 1104 may be configured to process baseband signals received from a receive signal path of the RF circuitry 1106. The baseband 1104 may also be configured to generate baseband signals for a transmit signal path of the RF circuitry 1106. The baseband processing circuitry 1104 may interface with the application circuitry 1102 for generation and processing of the baseband signals, and for controlling operations of the RF circuitry 1106.

By way of non-limiting example, the baseband circuitry 1104 may include at least one of a second generation (2G) baseband processor 1104A, a third generation (3G) baseband processor 1104B, a fourth generation (4G) baseband processor 1104C, other baseband processor(s) 1104D for other existing generations and generations in development or to be developed in the future (e.g., fifth generation (5G), 6G, etc.). The baseband circuitry 1104 (e.g., at least one of baseband processors 1104A-1104D) may handle various radio control functions that enable communication with one or more radio networks via the RF circuitry 1106. By way of non-limiting example, the radio control functions may include signal modulation/demodulation, encoding/decoding, radio frequency shifting, other functions, and combinations thereof. In some embodiments, modulation/demodulation circuitry of the baseband circuitry 1104 may be programmed to perform Fast-Fourier Transform (FFT), precoding, constellation mapping/demapping functions, other functions, and combinations thereof. In some embodiments, encoding/decoding circuitry of the baseband circuitry 1104 may be programmed to perform convolutions, tail-biting convolutions, turbo, Viterbi, Low Density Parity Check (LDPC) encoder/decoder functions, other functions, and combinations thereof. Embodiments of modulation/demodulation and encoder/decoder functions are not limited to these examples, and may include other suitable functions.

In some embodiments, the baseband circuitry 1104 may include elements of a protocol stack. By way of non-limiting example, elements of an evolved universal terrestrial radio access network (EUTRAN) protocol include, for example, physical (PHY), media access control (MAC), radio link control (RLC), packet data convergence protocol (PDCP), and/or radio resource control (RRC) elements. A central processing unit (CPU) 1104E of the baseband circuitry 1104 may be programmed to run elements of the protocol stack for signaling of the PHY, MAC, RLC, PDCP and/or RRC layers. In some embodiments, the baseband circuitry 1104 may include one or more audio digital signal processor(s) (DSP) 1104F. The audio DSP(s) 1104F may include elements for compression/decompression and echo cancellation. The audio DSP(s) 1104F may also include other suitable processing elements.

The baseband circuitry 1104 may further include memory/storage 1104G. The memory/storage 1104G may include data and/or instructions for operations performed by the processors of the baseband circuitry 1104 stored thereon. In some embodiments, the memory/storage 1104G may include any combination of suitable volatile memory and/or non-volatile memory. The memory/storage 1104G may also include any combination of various levels of memory/storage including, but not limited to, read-only memory (ROM) having embedded software instructions (e.g., firmware), random access memory (e.g., dynamic random access memory (DRAM)), cache, buffers, etc. In some embodiments, the memory/storage 1104G may be shared among the various processors or dedicated to particular processors.

Components of the baseband circuitry 1104 may be suitably combined in a single chip or a single chipset, or disposed on a same circuit board in some embodiments. In some embodiments, some or all of the constituent components of the baseband circuitry 1104 and the application circuitry 1102 may be implemented together, such as, for example, on a system on a chip (SOC).

In some embodiments, the baseband circuitry 1104 may provide for communication compatible with one or more radio technologies. For example, in some embodiments, the baseband circuitry 1104 may support communication with an EUTRAN and/or other wireless metropolitan area networks (WMAN), a wireless local area network (WLAN), or a wireless personal area network (WPAN). Embodiments in which the baseband circuitry 1104 is configured to support radio communications of more than one wireless protocol may be referred to as multi-mode baseband circuitry.

The RF circuitry 1106 may enable communication with wireless networks using modulated electromagnetic radiation through a non-solid medium. In various embodiments, the RF circuitry 1106 may include switches, filters, amplifiers, etc., to facilitate the communication with the wireless network. The RF circuitry 1106 may include a receive signal path, which may include circuitry to down-convert RF signals received from the FEM circuitry 1108, and provide baseband signals to the baseband circuitry 1104. The RF circuitry 1106 may also include a transmit signal path, which may include circuitry to up-convert baseband signals provided by the baseband circuitry 1104, and provide RF output signals to the FEM circuitry 1108 for transmission.

In some embodiments, the RF circuitry 1106 may include a receive signal path and a transmit signal path. The receive signal path of the RF circuitry 1106 may include mixer circuitry 1106A, amplifier circuitry 1106B, and filter circuitry 1106C. The transmit signal path of the RF circuitry 1106 may include filter circuitry 1106C and mixer circuitry 1106A. The RF circuitry 1106 may further include synthesizer circuitry 1106D configured to synthesize a frequency for use by the mixer circuitry 1106A of the receive signal path and the transmit signal path. In some embodiments, the mixer circuitry 1106A of the receive signal path may be configured to down-convert RF signals received from the FEM circuitry 1108 based on the synthesized frequency provided by synthesizer circuitry 1106D. The amplifier circuitry 1106B may be configured to amplify the down-converted signals.

The filter circuitry 1106C may include a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may include zero-frequency baseband signals, although this is optional, of course. In some embodiments, the mixer circuitry 1106A of the receive signal path may comprise passive mixers, although the scope of the embodiments is not limited in this respect.

In some embodiments, the mixer circuitry 1106A of the transmit signal path may be configured to up-convert input baseband signals based on the synthesized frequency provided by the synthesizer circuitry 1106D to generate RF output signals for the FEM circuitry 1108. The baseband signals may be provided by the baseband circuitry 1104 and may be filtered by filter circuitry 1106C. The filter circuitry 1106C may include a low-pass filter (LPF), although the scope of the embodiments is not limited in this respect.

In some embodiments, the mixer circuitry 1106A of the receive signal path and the mixer circuitry 1106A of the transmit signal path may include two or more mixers, and may be arranged for quadrature downconversion and/or upconversion, respectively. In some embodiments, the mixer circuitry 1106A of the receive signal path and the mixer circuitry 1106A of the transmit signal path may include two or more mixers and may be arranged for image rejection (e.g., Hartley image rejection). In some embodiments, the mixer circuitry 1106A of the receive signal path and the mixer circuitry 1106A of the transmit signal path may be arranged for direct downconversion and/or direct upconversion, respectively. In some embodiments, the mixer circuitry 1106A of the receive signal path and the mixer circuitry 1106A of the transmit signal path may be configured for super-heterodyne operation.

In some embodiments, the output baseband signals and the input baseband signals may be analog baseband signals, although the scope of the embodiments is not limited in this respect. In other embodiments, the output baseband signals and the input baseband signals may be digital baseband signals. In such embodiments, the RF circuitry 1106 may include analog-to-digital converter (ADC) and digital-to-analog converter (DAC) circuitry, and the baseband circuitry 1104 may include a digital baseband interface to communicate with the RF circuitry 1106.

In some dual-mode embodiments, separate radio integrated circuit (IC) circuitry may be provided for processing signals for each spectrum, although the scope of the embodiments is not limited in this respect.

In some embodiments, the synthesizer circuitry 1106D may include one or more of a fractional-N synthesizer and a fractional N/N+1 synthesizer, although the scope of the embodiments is not limited in this respect, as other types of frequency synthesizers may be suitable. For example, synthesizer circuitry 1106D may include a delta-sigma synthesizer, a frequency multiplier, a synthesizer comprising a phase-locked loop with a frequency divider, other synthesizers, and combinations thereof.

The synthesizer circuitry 1106D may be configured to synthesize an output frequency for use by the mixer circuitry 1106A of the RF circuitry 1106 based on a frequency input and a divider control input. In some embodiments, the synthesizer circuitry 1106D may be a fractional N/N+1 synthesizer.

In some embodiments, frequency input may be provided by a voltage controlled oscillator (VCO). Divider control input may be provided by either the baseband circuitry 1104 or the application circuitry 1102 depending on the desired output frequency. In some embodiments, a divider control input (e.g., N) may be determined from a look-up table based on a channel indicated by the application circuitry 1102.

The synthesizer circuitry 1106D of the RF circuitry 1106 may include a divider, a delay-locked loop (DLL), a multiplexer, and a phase accumulator. In some embodiments, the divider may include a dual modulus divider (DMD), and the phase accumulator may include a digital phase accumulator (DPA). In some embodiments, the DMD may be configured to divide the input signal by either N or N+1 (e.g., based on a carry-out) to provide a fractional division ratio. In some example embodiments, the DLL may include a set of cascaded, tunable, delay elements; a phase detector; a charge pump; and a D-type flip-flop. In such embodiments, the delay elements may be configured to break a VCO period up into Nd equal packets of phase, where Nd is the number of delay elements in the delay line. In this way, the DLL may provide negative feedback to help ensure that the total delay through the delay line is one VCO cycle.

In some embodiments, the synthesizer circuitry 1106D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

The FEM circuitry 1108 may include a receive signal path, which may include circuitry configured to operate on RF signals received from one or more antennas 1110, amplify the received signals, and provide the amplified versions of the received signals to the RF circuitry 1106 for further processing. The FEM circuitry 1108 may also include a transmit signal path, which may include circuitry configured to amplify signals for transmission provided by the RF circuitry 1106 for transmission by at least one of the antennas 1110.

In some embodiments, the FEM circuitry 1108 may include a TX/RX switch configured to switch between a transmit mode and a receive mode operation. The FEM circuitry 1108 may include a receive signal path and a transmit signal path. The receive signal path of the FEM circuitry 1108 may include a low-noise amplifier (LNA) to amplify received RF signals and provide the amplified received RF signals as an output (e.g., to the RF circuitry 1106). The transmit signal path of the FEM circuitry 1108 may include a power amplifier (PA) configured to amplify input RF signals (e.g., provided by RF circuitry 1106), and one or more filters configured to generate RF signals for subsequent transmission (e.g., by one or more of the antennas 1110).

In some embodiments, the UE device 1100 may include additional elements such as, for example, memory/storage, a display, a camera, one or more sensors, an input/output (I/O) interface, other elements, and combinations thereof.

In some embodiments, the UE device 1100 may be configured to perform one or more processes, techniques, and/or methods as described herein, or portions thereof.

EXAMPLES

The following examples pertain to further embodiments.

Example 1

A user equipment (UE) configured to use a narrowband (NB) bandwidth when performing random access of a cellular network associated with an evolved Node B (eNB) providing the NB bandwidth at a frequency band of a repurposed deployment using global systems for mobile communications (GSM) spectrum, an in-band deployment using a physical resource block (PRB) of a larger-bandwidth long term evolution (LTE) system, or a guard-band deployment using a guard band of the larger-bandwidth LTE system, the UE comprising: control circuitry configured to generate an NB-physical random access channel (NB-PRACH) defined by an NB-PRACH physical structure and an NB-PRACH numerology; the NB-PRACH physical structure including a cyclic prefix (CP), a guard time (GT), and an NB-PRACH sequence between the CP and the GT; and the NB-PRACH numerology configured to size components of the NB-PRACH physical structure such that a beginning of the CP and an end of the GT temporally correspond with a beginning and an end of one or more LTE subframes that each have a one millisecond (1 ms) duration, and the NB-PRACH numerology configured to maintain a number of subcarriers at a subcarrier spacing to establish the NB-PRACH as having an NB-PRACH bandwidth within the NB bandwidth.

Example 2

The UE of any other example, further comprising transmit circuitry coupled to the control circuitry, the transmit circuitry configured to transmit the NB-PRACH in the frequency band and within the NB-PRACH bandwidth of about 200 kHz or less.

Example 3

The UE of any other example, in which the NB-PRACH further includes coded bits that carry information related to a scheduling request (SR).

Example 4

The UE of example 3, in which control circuitry is further configured to generate, in a time dimension, the SR between the NB-PRACH sequence and the GT, or after the GT.

Example 5

The UE of any other example, in which a length of the CP is different from that of a CP used for transmission of an NB-physical uplink shared channel (NB-PUSCH) and/or an NB-physical uplink control channel (NB-PUCCH).

Example 6

The UE of any other example, in which a design of the NB-PRACH sequence is based on one or more Zadoff-Chu (ZC) sequences of prime-number length.

Example 7

The UE of any other example, in which the control circuitry is further configured to randomly select one NB-PRACH preamble signature and a scheduling request (SR) transmission opportunity for transmission of the NB-PRACH and an SR within one LTE subframe.

Example 8

The UE of any other example, in which the control circuitry is further configured to select a combination of an NB-PRACH preamble signature and a scheduling request (SR) transmission opportunity based on a single selection defining a one-to-one mapping between the NB-PRACH preamble signature and the SR transmission opportunity.

Example 9

The UE of any other example, in which the NB-PRACH bandwidth is about 90 kHz.

Example 10

The UE of any other example, in which the NB-PRACH includes a scheduling request (SR), and the control circuitry is configured to multiplex the NB-PRACH with the SR by frequency division multiplexing (FDM) such that the SR is configured for simultaneous transmission in an NB-physical uplink shared channel (NB-PUSCH) and/or an NB-physical uplink control channel (NB-PUCCH).

Example 11

The UE of any other example, in which the subcarrier spacing for the LTE subframe carrying the NB-PRACH is set to a smaller value than 15 kHz and is equal to that of an NB-physical uplink control channel (NB-PUCCH) and/or an NB-physical uplink shared channel (NB-PUSCH).

Example 12

The UE of example 10 or 11, in which a subcarrier spacing for a legacy PUSCH is an integer multiple of the subcarrier spacing for one or both of the NB-PRACH and the NB-PUSCH.

Example 13

The UE of any other example, in which the subcarrier spacing for the NB-PRACH is different from that used for other uplink (UL) transmissions for a larger-bandwidth LTE system physical uplink control channel (PUCCH), a larger-bandwidth LTE system physical uplink shared channel (PUSCH), and/or a larger-bandwidth LTE system PRACH.

Example 14

The UE of any other example, in which the NB-PRACH includes guard bands at its edges, and in which a size of a guard band for the NB-PRACH is smaller than that of a larger-bandwidth LTE system PRACH.

Example 15

The UE of any other example, in which the NB-PRACH sequence comprises multiple repetitions of an NB-PRACH preamble sequence.

Example 16

The UE of example 15, in which the control circuitry is further configured to apply a cover code to the NB-PRACH.

Example 17

The UE of example 15, in which the control circuitry, in response to a failure to receive a random access response (RAR) from the eNB after NB-PRACH transmissions at a first NB-PRACH repetition level, configures the UE to transmit at a second NB-PRACH repetition level that is different from the first NB-PRACH repetition level.

Example 18

The UE of any other example, in which the control circuitry selects NB-PRACH resources based on repetition levels or coverage classes, the NB-PRACH resources being separated based on either time-division multiplexing (TDM) for transmission in one or multiple subframes, code-division multiplexing (CDM) having different NB-PRACH preambles reserved for each repetition level or coverage class, or frequency-division multiplexing (FDM) for transmission in one or more NB bandwidths.

Example 19

The UE of any other example, in which the UE is configured to receive NB-LTE system information blocks (NB-LTE SIBs) as part of an NB-PRACH configuration signaling, and the UE, in response to the NB-PRACH configuration signaling, is configured to transmit by using a power ramping mechanism to adjust NB-PRACH transmit power based on a selected number of repetitions of the NB-PRACH sequence.

Example 20

The UE of any other example, in which a minimum distance between cyclic shifts ($N_{CS}$) for the NB-PRACH sequence is reduced compared to those of larger-bandwidth LTE PRACH sequences.

Example 21

The UE of example 20, in which the minimum distance between cyclic shifts is given by an expression $N_{CS} \geq \mathrm{ceil}((2*R/c+DS)*(N_{ZC}/T_{SEQ}))+g_s$; where R, c, DS, $N_{ZC}$, $T_{SEQ}$, and $g_s$ are, respectively, the target cell radius, speed of light, target maximum delay spread, NB-PRACH sequence length, NB-PRACH sequence duration, and additional guard samples.

Example 22

The UE of any other example, in which the control circuitry is configured to establish an NB-PRACH configuration based on an NB-PRACH configuration index that is less than six bits in size and code-points of the NB-PRACH configuration index that indicate an NB-PRACH preamble format among multiple NB-PRACH preamble formats, and/or that indicate time resources available for NB-PRACH transmission.

Example 23

The UE of example 22, in which the time resources available for NB-PRACH transmission are based on an expression k*f*10 ms, where k and f are, respectively, an integer value greater than or equal to one, and a ratio of downlink (DL) to uplink (UL) subcarrier spacing.

Example 24

A method performed by a user equipment (UE) configured to use a narrowband (NB) bandwidth when performing random access of a cellular network associated with an evolved Node B (eNB), the method comprising: receiving from the eNB an indication of availability of the NB bandwidth at a frequency band of a repurposed deployment using global systems for mobile communications (GSM) spectrum, an in-band deployment using a physical resource block (PRB) of a larger-bandwidth long term evolution (LTE) system, or a guard-band deployment using a guard band of the larger-bandwidth LTE system; and generating an NB-physical random access channel (NB-PRACH) defined by an NB-PRACH physical structure and an NB-PRACH numerology; the NB-PRACH physical structure including a cyclic prefix (CP), a guard time (GT), and an NB-PRACH sequence between the CP and the GT; and the NB-PRACH numerology configured to size components of the NB-PRACH physical structure such that a beginning of the CP and an end of the GT temporally correspond with a beginning and an end of one or more LTE subframes that each have a one millisecond (1 ms) duration, and the NB-PRACH numerology configured to maintain a number of subcarriers at a subcarrier spacing to establish the NB-PRACH as having an NB-PRACH bandwidth within the NB bandwidth.

Example 25

The method of any other example, further comprising transmitting the NB-PRACH in the frequency band and within the NB-PRACH bandwidth of about 200 kHz or less.

Example 26

The method of any other example, in which the NB-PRACH further includes coded bits that carry information related to a scheduling request (SR).

Example 27

The method of example 26, further comprising generating, in a time dimension, the SR between the NB-PRACH sequence and the GT, or after the GT.

Example 28

The method of any other example, in which a length of the CP is different from that of a CP used for transmission of an NB-physical uplink shared channel (NB-PUSCH) and/or an NB-physical uplink control channel (NB-PUCCH).

Example 29

The method of any other example, in which a design of the NB-PRACH sequence is based on one or more Zadoff-Chu (ZC) sequences of prime-number length.

Example 30

The method of any other example, further comprising randomly selecting one NB-PRACH preamble signature and a scheduling request (SR) transmission opportunity for transmission of the NB-PRACH and an SR within one LTE subframe.

Example 31

The method of any other example, further comprising selecting a combination of an NB-PRACH preamble signature and a scheduling request (SR) transmission opportunity based on a single selection defining a one-to-one mapping between the NB-PRACH preamble signature and the SR transmission opportunity.

Example 32

The method of any other example, in which the NB-PRACH bandwidth is about 90 kHz.

Example 33

The method of any other example, in which the NB-PRACH includes a scheduling request (SR), and the method further comprises multiplexing the NB-PRACH with the SR by frequency division multiplexing (FDM) such that the SR is configured for simultaneous transmission in an NB-physical uplink shared channel (NB-PUSCH) and/or an NB-physical uplink control channel (NB-PUCCH).

Example 34

The method of any other example, in which the subcarrier spacing for the LTE subframe carrying the NB-PRACH is set to a smaller value than 15 kHz and is equal to that of an NB-physical uplink control channel (NB-PUCCH) and/or an NB-physical uplink shared channel (NB-PUSCH).

Example 35

The method of example 33 or 34, in which a subcarrier spacing for a legacy PUSCH is an integer multiple of the subcarrier spacing for one or both of the NB-PRACH and the NB-PUSCH.

Example 36

The method of any other example, in which the subcarrier spacing for the NB-PRACH is different from that used for other uplink (UL) transmissions for a larger-bandwidth LTE system physical uplink control channel (PUCCH), a larger-bandwidth LTE system physical uplink shared channel (PUSCH), and/or a larger-bandwidth LTE system PRACH.

Example 37

The method of any other example, in which the NB-PRACH includes guard bands at its edges, and in which a size of a guard band for the NB-PRACH is smaller than that of a larger-bandwidth LTE system PRACH.

Example 38

The method of any other example, in which the NB-PRACH sequence comprises multiple repetitions of an NB-PRACH preamble sequence.

Example 39

The method of example 38, further comprising applying a cover code to the NB-PRACH preamble sequence.

Example 40

The method of example 38, further comprising, in response to a failure to receive a random access response (RAR) from the eNB after NB-PRACH transmissions at a first NB-PRACH repetition level, transmitting at a second NB-PRACH repetition level that is different from the first NB-PRACH repetition level.

Example 41

The method of any other example, further comprising selecting NB-PRACH resources based on repetition levels or coverage classes, the NB-PRACH resources being separated based on either time-division multiplexing (TDM) for transmission in one or multiple subframes, code-division multiplexing (CDM) having different NB-PRACH preambles reserved for each repetition level or coverage class, or frequency-division multiplexing (FDM) for transmission in one or more NB bandwidths.

Example 42

The method of any other example, further comprising: receiving NB-LTE system information blocks (NB-LTE SIBs) as part of an NB-PRACH configuration signaling; and in response to the NB-PRACH configuration signaling, transmitting according to a power ramping mechanism to adjust NB-PRACH transmit power based on a selected number of repetitions of the NB-PRACH sequence.

Example 43

The method of any other example, in which a minimum distance between cyclic shifts ($N_{CS}$) for the NB-PRACH sequence is reduced compared to those of larger-bandwidth LTE PRACH sequences.

Example 44

The method of example 43, in which the minimum distance between cyclic shifts is given by an expression $N_{CS} \geq \mathrm{ceil}((2*R/c+DS)*(N_{ZC}/T_{SEQ}))+g_s$; where R, c, DS, $N_{ZC}$, $T_{SEQ}$, and $g_s$ are, respectively, the target cell radius, speed of light, target maximum delay spread, NB-PRACH sequence length, NB-PRACH sequence duration, and additional guard samples.

Example 45

The method of any other example, further comprising establishing an NB-PRACH configuration based on an NB-PRACH configuration index that is less than six bits in size and code-points of the NB-PRACH configuration index that indicate an NB-PRACH preamble format among multiple NB-PRACH preamble formats, and/or that indicate time resources available for NB-PRACH transmission.

Example 46

The method of example 45, in which the time resources available for NB-PRACH transmission are based on an expression k*f*10 ms, where k and f are, respectively, an integer value greater than or equal to one, and a ratio of downlink (DL) to uplink (UL) subcarrier spacing.

Example 47

An apparatus of a user equipment (UE) for accessing a narrowband (NB)-long term evolution (LTE) network connection, the apparatus comprising: control circuitry configured to generate an NB-physical random access channel (NB-PRACH) preamble and a scheduling request (SR), the NB-PRACH preamble being for transmission in an NB-PRACH and the SR being for transmission in a physical uplink (UL) channel having a frequency band that is different from that of the NB-PRACH, the NB-PRACH having a frequency bandwidth of up to about 200 kilohertz (kHz) and a transmission time duration of one or more LTE transmission time intervals (TTIs); and the control circuitry further configured to multiplex the NB-PRACH and SR by frequency division multiplexing (FDM) for simultaneous transmission during the transmission time duration and through, respectively, the NB-PRACH and the physical UL channel.

Example 48

The apparatus of any other example, in which the NB-PRACH further includes coded bits that carry information related to the SR.

Example 49

The apparatus of any other example, in which the NB-PRACH includes cyclic prefix (CP) having a length that is different from that of a CP used for transmission of an NB-physical uplink shared channel (NB-PUSCH) and/or an NB-physical uplink control channel (NB-PUCCH).

Example 50

The apparatus of any other example, in which a design of the NB-PRACH preamble includes a sequence based on one or more Zadoff-Chu (ZC) sequences of prime-number length.

Example 51

The apparatus of any other example, in which the control circuitry is further configured to randomly select one NB-PRACH preamble signature and a scheduling request (SR) transmission opportunity for transmission of the NB-PRACH and an SR within one LTE subframe.

Example 52

The apparatus of any other example, in which the control circuitry is further configured to select a combination of an NB-PRACH preamble signature and an SR transmission opportunity based on a single selection defining a one-to-one mapping between the NB-PRACH preamble signature and the SR transmission opportunity.

Example 53

The apparatus of any other example, in which the NB-PRACH frequency bandwidth is about 90 kHz.

Example 54

The apparatus of any other example, in which the control circuitry is configured to multiplex by FDM such that the SR is configured for simultaneous transmission in an NB-physical uplink shared channel (NB-PUSCH) and/or an NB-physical uplink control channel (NB-PUCCH).

Example 55

The apparatus of any other example, in which subcarrier spacing for an LTE subframe carrying the NB-PRACH is set to a smaller value than 15 kHz and is equal to that of an NB-physical uplink control channel (NB-PUCCH) and/or an NB-physical uplink shared channel (NB-PUSCH).

Example 56

The apparatus of example 54 or 55, in which a subcarrier spacing for a legacy PUSCH is an integer multiple of the subcarrier spacing for one or both of the NB-PRACH and the NB-PUSCH.

Example 57

The apparatus of any other example, in which subcarrier spacing for the NB-PRACH is different from that used for other uplink (UL) transmissions for a larger-bandwidth LTE system physical uplink control channel (PUCCH), a larger-bandwidth LTE system physical uplink shared channel (PUSCH), and/or a larger-bandwidth LTE system PRACH.

Example 58

The apparatus of any other example, in which the NB-PRACH includes guard bands at its edges, and in which a size of a guard band for the NB-PRACH is smaller than that of a larger-bandwidth LTE system PRACH.

Example 59

The apparatus of any other example, in which the NB-PRACH preamble comprises multiple repetitions of an NB-PRACH preamble sequence.

Example 60

The apparatus of example 59, in which the control circuitry is further configured to apply a spreading code to the NB-PRACH.

Example 61

The apparatus of example 59, in which, in response to a failure to receive a random access response (RAR) from the eNB after NB-PRACH transmissions at a first NB-PRACH repetition level, the control circuitry configures the UE to transmit at a second NB-PRACH repetition level that is different from the first NB-PRACH repetition level.

Example 62

The apparatus of any other example, in which the control circuitry selects NB-PRACH resources based on repetition levels or coverage classes, the NB-PRACH resources being separated based on either time-division multiplexing (TDM) for transmission in one or multiple subframes, code-division multiplexing (CDM) having different NB-PRACH preambles reserved for each repetition level or coverage class, or frequency-division multiplexing (FDM) for transmission in one or more NB bandwidths.

Example 63

The apparatus of any other example, in which the UE is configured to receive NB-LTE system information blocks (NB-LTE SIBs) as part of an NB-PRACH configuration signaling, and the UE, in response to the NB-PRACH configuration signaling, is configured to transmit by using a power ramping mechanism to adjust NB-PRACH transmit power based on a selected number of repetitions of the NB-PRACH sequence.

Example 64

The apparatus of any other example, in which a minimum distance between cyclic shifts ($N_{CS}$) for the NB-PRACH sequence is reduced compared to those of larger-bandwidth LTE PRACH sequences.

Example 65

The apparatus of example 64, in which the minimum distance between cyclic shifts is given by an expression $N_{CS} \geq \text{ceil}((2*R/c+DS)*(N_{ZC}/T_{SEQ})) \, g_s$; where R, c, DS, $N_{ZC}$, $T_{SEQ}$, and $g_s$ are, respectively, the target cell radius, speed of light, target maximum delay spread, NB-PRACH sequence length, NB-PRACH sequence duration, and additional guard samples.

Example 66

The apparatus of any other example, in which the control circuitry is configured to establish an NB-PRACH configuration based on an NB-PRACH configuration index that is less than six bits in size and code-points of the NB-PRACH configuration index that indicate an NB-PRACH preamble format among multiple NB-PRACH preamble formats, and/or that indicate time resources available for NB-PRACH transmission.

Example 67

The apparatus of example 66, in which the time resources available for NB-PRACH transmission are based on an expression $k*f*10$ ms, where k and f are, respectively, an integer value greater than or equal to one, and a ratio of downlink (DL) to uplink (UL) subcarrier spacing.

Example 68

A method performed by a user equipment (UE) for accessing a narrowband (NB)-long term evolution (LTE) network connection, the apparatus comprising: generating an NB-physical random access channel (NB-PRACH) preamble and a scheduling request (SR), the NB-PRACH preamble being for transmission in an NB-PRACH and the SR being for transmission in a physical uplink (UL) channel having a frequency band that is different from that of the NB-PRACH, the NB-PRACH having a frequency bandwidth of up to about 200 kilohertz (kHz) and a transmission time duration of one or more LTE transmission time intervals (TTIs); and multiplexing the NB-PRACH and SR by frequency division multiplexing (FDM) for simultaneous transmission during the transmission time duration and through, respectively, the NB-PRACH and the physical UL channel.

Example 69

The method of any other example, in which the NB-PRACH further includes coded bits that carry information related to the SR.

Example 70

The method of any other example, in which the NB-PRACH includes cyclic prefix (CP) having a length that is different from that of a CP used for transmission of an NB-physical uplink shared channel (NB-PUSCH) and/or an NB-physical uplink control channel (NB-PUCCH).

Example 71

The method of any other example, in which the NB-PRACH preamble includes a sequence based on one or more Zadoff-Chu (ZC) sequences of prime-number length.

Example 72

The method of any other example, further comprising randomly selecting one NB-PRACH preamble signature and a scheduling request (SR) transmission opportunity for transmission of the NB-PRACH and an SR within one LTE subframe.

Example 73

The method of any other example, further comprising selecting a combination of an NB-PRACH preamble signature and an SR transmission opportunity based on a single selection defining a one-to-one mapping between the NB-PRACH preamble signature and the SR transmission opportunity.

Example 74

The method of any other example, in which the NB-PRACH frequency bandwidth is about 90 kHz.

Example 75

The method of any other example, further comprising multiplexing by FDM such that the SR is configured for simultaneous transmission in an NB-physical uplink shared channel (NB-PUSCH) and/or an NB-physical uplink control channel (NB-PUCCH).

Example 76

The method of any other example, in which subcarrier spacing for an LTE subframe carrying the NB-PRACH is set to a smaller value than 15 kHz and is equal to that of an NB-physical uplink control channel (NB-PUCCH) and/or an NB-physical uplink shared channel (NB-PUSCH).

Example 77

The method of example 75 or 76, in which a subcarrier spacing for a legacy PUSCH is an integer multiple of the subcarrier spacing for one or both of the NB-PRACH and the NB-PUSCH.

Example 78

The method of any other example, in which subcarrier spacing for the NB-PRACH is different from that used for other uplink (UL) transmissions for a larger-bandwidth LTE system physical uplink control channel (PUCCH), a larger-bandwidth LTE system physical uplink shared channel (PUSCH), and/or a larger-bandwidth LTE system PRACH.

Example 79

The method of any other example, in which the NB-PRACH includes guard bands at its edges, and in which a size of a guard band for the NB-PRACH is smaller than that of a larger-bandwidth LTE system PRACH.

Example 80

The method of any other example, in which the NB-PRACH preamble comprises multiple repetitions of an NB-PRACH preamble sequence.

Example 81

The method of example 80, further comprising applying a spreading code to the NB-PRACH.

Example 82

The method of example 80, further comprising, in response to a failure to receive a random access response (RAR) from the eNB after NB-PRACH transmissions at a first NB-PRACH repetition level, configuring the UE to transmit at a second NB-PRACH repetition level that is different from the first NB-PRACH repetition level.

Example 83

The method of any other example, further comprising selecting NB-PRACH resources based on repetition levels or coverage classes, the NB-PRACH resources being separated based on either time-division multiplexing (TDM) for transmission in one or multiple subframes, code-division multiplexing (CDM) having different NB-PRACH preambles reserved for each repetition level or coverage class, or frequency-division multiplexing (FDM) for transmission in one or more NB bandwidths.

Example 84

The method of any other example, in which the UE is configured to receive NB-LTE system information blocks (NB-LTE SIBs) as part of an NB-PRACH configuration signaling, and the UE, in response to the NB-PRACH configuration signaling, is configured to transmit by using a power ramping mechanism to adjust NB-PRACH transmit power based on a selected number of repetitions of the NB-PRACH sequence.

Example 85

The method of any other example, in which a minimum distance between cyclic shifts (NCS) for the NB-PRACH sequence is reduced compared to those of larger-bandwidth LTE PRACH sequences.

Example 86

The apparatus of example 85, in which the minimum distance between cyclic shifts is given by an expression $N_{CS} \geq \text{ceil}((2*R/c+DS)*(N_{ZC}/T_{SEQ})) \, g_s$; where R, c, DS, $N_{ZC}$, $T_{SEQ}$, and $g_s$ are, respectively, the target cell radius, speed of light, target maximum delay spread, NB-PRACH sequence length, NB-PRACH sequence duration, and additional guard samples.

Example 87

The method of any other example, further comprising establishing an NB-PRACH configuration based on an NB- PRACH configuration index that is less than six bits in size and code-points of the NB-PRACH configuration index that indicate an NB-PRACH preamble format among multiple NB-PRACH preamble formats, and/or that indicate time resources available for NB-PRACH transmission.

Example 88

The method of example 87, in which the time resources available for NB-PRACH transmission are based on an expression k*f*10 ms, where k and f are, respectively, an integer value greater than or equal to one, and a ratio of downlink (DL) to uplink (UL) subcarrier spacing.

Example 89

An evolved Node B (eNB) for receiving a narrowband (NB)-physical random access channel (PRACH) to a first user equipment (UE), the eNB comprising: transmit circuitry configured to transmit information indicating available resources for an NB-PRACH and one or more other uplink (UL) channels, the available resources including a first portion of system bandwidth allocated for the NB-PRACH and a second portion of system bandwidth allocated for the one or more other UL channels, the first portion of system bandwidth being about 200 kilohertz (kHz) or less; and receive circuitry configured to simultaneously receive the NB-PRACH from the first UE and the one or more UL channels from a second UE that is different than the first UE.

Example 90

The eNB of any other example, in which the one or more UL channels include a NB-physical uplink shared channel (PUSCH).

Example 91

The eNB of any other example, in which the one or more UL channels include a NB-physical uplink control channel (PUCCH).

Example 92

The eNB of any other example, in which the system bandwidth is greater than or equal to about 1.4 MHz.

Example 93

The eNB of any other example, in which the system bandwidth is 200 kilohertz (kHz) or less.

Example 94

The eNB of any other example, in which the NB-PRACH is multiplexed with a scheduling request message provided in another uplink channel.

Example 95

The eNB of any other example, in which the NB-PRACH has an NB-PRACH bandwidth of less than 180 kHz.

Example 96

The eNB of any other example, in which the NB-PUCCH is received in an outer portion of the system bandwidth.

Example 97

The eNB of any other example, in which the one or more UL channels include a physical uplink shared channel (PUSCH) of a larger-bandwidth system for supporting multiplexing with the NB-PRACH.

Example 98

The eNB of any other example, in which the one or more UL channels include a physical uplink control channel (PUCCH) of a larger-bandwidth system for supporting multiplexing with the NB-PRACH.

Example 99

An apparatus comprising means to perform one or more elements of a method described in or related to any of examples 24-46 and 68-88, and/or any other method or process described herein.

Example 100

One or more non-transitory (or transitory) computer-readable media comprising instructions to cause an electronic device, upon execution of the instructions by one or more processors of the electronic device, to perform one or more elements of a method described in or related to any of examples 24-46 and 68-88, and/or any other method or process described herein.

Example 101

An apparatus comprising control logic, transmit logic, and/or receive logic to perform one or more elements of a method described in or related to any of examples 24-46 and 68-88, and/or any other method or process described herein.

Example 102

A method of communicating in a wireless network as shown and described herein.

Example 103

A system for providing wireless communication as shown and described herein.

Example 104

A device for providing wireless communication as shown and described herein.

Some of the infrastructure that can be used with embodiments disclosed herein is already available, such as general-purpose computers, mobile phones, computer programming tools and techniques, digital storage media, and communications networks. A computing device may include a processor such as a microprocessor, microcontroller, logic circuitry, or the like. The computing device may include a computer-readable storage device such as non-volatile memory, static random access memory (RAM), dynamic RAM, read-only memory (ROM), disk, tape, magnetic memory, optical memory, flash memory, or another computer-readable storage medium.

Various aspects of certain embodiments may be implemented using hardware, software, firmware, or a combination thereof. A component or module may refer to, be part of, or include an application specific integrated circuit (ASIC), an electronic circuit, a processor (shared, dedicated, or group), and/or memory (shared, dedicated or group) that executes one or more software or firmware programs, a combinational logic circuit, and/or other suitable components that provide the described functionality. As used herein, a software module or component may include any type of computer instruction or computer executable code located within or on a non-transitory computer-readable storage medium. A software module or component may, for instance, comprise one or more physical or logical blocks of computer instructions, which may be organized as a routine, program, object, component, data structure, etc., which performs one or more tasks or implements particular abstract data types.

In certain embodiments, a particular software module or component may comprise disparate instructions stored in different locations of a computer-readable storage medium, which together implement the described functionality of the module or component. Indeed, a module or component may comprise a single instruction or many instructions, and may be distributed over several different code segments, among different programs, and across several computer-readable storage media. Some embodiments may be practiced in a distributed computing environment where tasks are performed by a remote processing device linked through a communications network.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Skilled persons will recognize that many changes may be made to the details of the above-described embodiments without departing from the underlying principles of the disclosure. For example, while the design concepts are described herein using the example of NB-LTE systems, they can also be straightforwardly applied to other narrowband CIoT systems. The scope of the present invention should, therefore, be determined only by claims.

The invention claimed is:

1. Electronic device circuitry for a user equipment (UE) configured to use a narrowband (NB) bandwidth when performing random access of a cellular network associated with an evolved Node B (eNB) providing the NB bandwidth at a frequency band of a repurposed deployment using global systems for mobile communications (GSM) spectrum, an in-band deployment using a physical resource block (PRB) of a larger-bandwidth long term evolution (LTE) system, or a guard-band deployment using a guard band of the larger-bandwidth LTE system, the electronic device circuitry comprising:
control circuitry configured to generate an NB-physical random access channel (NB-PRACH) defined by an NB-PRACH physical structure and an NB-PRACH numerology;
the NB-PRACH physical structure including a cyclic prefix (CP), a guard time (GT), and an NB-PRACH sequence between the CP and the GT; and
the NB-PRACH numerology configured to size components of the NB-PRACH physical structure such that a beginning of the CP and an end of the GT temporally correspond with a beginning and an end of one or more LTE subframes that each have a one millisecond (1 ms) duration, and the NB-PRACH numerology configured to maintain a number of subcarriers at a subcarrier spacing to establish the NB-PRACH as having an NB-PRACH bandwidth within the NB bandwidth,
wherein the control circuitry is further configured to randomly select one NB-PRACH preamble signature and a scheduling request (SR) transmission opportunity for transmission of the NB-PRACH and an SR within one LTE subframe.

2. The electronic device circuitry of claim 1, further comprising transmit circuitry coupled to the control circuitry, the transmit circuitry configured to transmit the NB-PRACH in the frequency band and within the NB-PRACH bandwidth of about 200 kHz or less.

3. The electronic device circuitry of claim 1, in which the NB-PRACH further includes coded bits that carry information related to the SR.

4. The electronic device circuitry of claim 3, in which control circuitry is further configured to generate, in a time dimension, the SR between the NB-PRACH sequence and the GT, or after the GT.

5. The electronic device circuitry of claim 1, in which a length of the CP is different from that of a CP used for transmission of an NB-physical uplink shared channel (NB-PUSCH) and/or an NB-physical uplink control channel (NB-PUCCH).

6. The electronic device circuitry of claim 1, in which a design of the NB-PRACH sequence is based on one or more Zadoff-Chu (ZC) sequences of prime-number length.

7. The electronic device circuitry of claim 1, in which the control circuitry is further configured to select a combination of an NB-PRACH preamble signature and a scheduling request (SR) transmission opportunity based on a single selection defining a one-to-one mapping between the NB-PRACH preamble signature and the SR transmission opportunity.

8. The electronic device circuitry of claim 1, in which the NB-PRACH bandwidth is 90 kHz.

9. The electronic device circuitry of claim 1, in which the NB-PRACH includes a scheduling request (SR), and the control circuitry is configured to multiplex the NB-PRACH with the SR by frequency division multiplexing (FDM) such that the SR is configured for simultaneous transmission in an NB-physical uplink shared channel (NB-PUSCH) and/or an NB-physical uplink control channel (NB-PUCCH).

10. The electronic device circuitry of claim 1, in which the subcarrier spacing for the LTE subframe carrying the NB-PRACH is set to a smaller value than 15 kHz and is equal to that of an NB-physical uplink control channel (NB-PUCCH) and/or an NB-physical uplink shared channel (NB-PUSCH).

11. The electronic device circuitry of claim 10, in which a subcarrier spacing for a legacy PUSCH is an integer multiple of the subcarrier spacing for one or both of the NB-PRACH and the NB-PUSCH.

12. A method performed by a user equipment (UE) configured to use a narrowband (NB) bandwidth when performing random access of a cellular network associated with an evolved Node B (eNB), the method comprising:
receiving from the eNB an indication of availability of the NB bandwidth at a frequency band of a repurposed deployment using global systems for mobile communications (GSM) spectrum, an in-band deployment using a physical resource block (PRB) of a larger-bandwidth long term evolution (LTE) system, or a guard-band deployment using a guard band of the larger-bandwidth LTE system; and generating an NB-physical random access channel (NB-PRACH) defined by an NB-PRACH physical structure and an NB-PRACH numerology;

the NB-PRACH physical structure including a cyclic prefix (CP), a guard time (GT), and an NB-PRACH sequence between the CP and the GT;

the NB-PRACH numerology configured to size components of the NB-PRACH physical structure such that a beginning of the CP and an end of the GT temporally correspond with a beginning and an end of one or more LTE subframes that each have a one millisecond (1 ms) duration, and the NB-PRACH numerology configured to maintain a number of subcarriers at a subcarrier spacing to establish the NB-PRACH as having an NB-PRACH bandwidth within the NB bandwidth; and selecting a combination of an NB-PRACH preamble signature and a scheduling request (SR) transmission opportunity based on a single selection defining a one-to-one mapping between the NB-PRACH preamble signature and the SR transmission opportunity.

13. The method of claim 12, in which the subcarrier spacing for the NB-PRACH is different from that used for other uplink (UL) transmissions for a larger-bandwidth LTE system physical uplink control channel (PUCCH), a larger-bandwidth LTE system physical uplink shared channel (PUSCH), and/or a larger-bandwidth LTE system PRACH.

14. The method of claim 12, in which the NB-PRACH includes guard bands at its edges, and in which a size of a guard band for the NB-PRACH is smaller than that of a larger-bandwidth LTE system PRACH.

15. The method of claim 12, in which the NB-PRACH sequence comprises multiple repetitions of an NB-PRACH preamble sequence.

16. The method of claim 15, further comprising applying a cover code to the NB-PRACH preamble sequence.

17. The method of claim 15, further comprising, in response to a failure to receive a random access response (RAR) from the eNB after NB-PRACH transmissions at a first NB-PRACH repetition level, transmitting at a second NB-PRACH repetition level that is different from the first NB-PRACH repetition level.

18. An apparatus of a user equipment (UE) for accessing a narrowband (NB)-long term evolution (LTE) network connection, the apparatus comprising:

control circuitry configured to generate an NB-physical random access channel (NB-PRACH) preamble and a scheduling request (SR), the NB-PRACH preamble being for transmission in an NB-PRACH and the SR being for transmission in a physical uplink (UL) channel having a frequency band that is different from that of the NB-PRACH, the NB-PRACH having a frequency bandwidth of up to 200 kilohertz (kHz) and a transmission time duration of one or more LTE transmission time intervals (TTIs); and the control circuitry further configured to multiplex the NB-PRACH and SR by frequency division multiplexing (FDM) for simultaneous transmission during the transmission time duration and through, respectively, the NB-PRACH and the physical UL channel, wherein a minimum distance between cyclic shifts (NCS) for the NB-PRACH sequence is reduced compared to those of larger-bandwidth LTE PRACH sequences.

19. The apparatus of claim 18, in which the control circuitry selects NB-PRACH resources based on repetition levels or coverage classes, the NB-PRACH resources being separated based on either time-division multiplexing (TDM) for transmission in one or multiple subframes, code-division multiplexing (CDM) having different NB-PRACH preambles reserved for each repetition level or coverage class, or frequency-division multiplexing (FDM) for transmission in one or more NB bandwidths.

20. The apparatus of claim 18, in which the UE is configured to receive NB-LTE system information blocks (NB-LTE SIBs) as part of an NB-PRACH configuration signaling, and the UE, in response to the NB-PRACH configuration signaling, is configured to transmit by using a power ramping mechanism to adjust NB-PRACH transmit power based on a selected number of repetitions of the NB-PRACH sequence.

21. The apparatus of claim 18, in which the minimum distance between cyclic shifts is given by an expression $NCS \geq \text{ceil}((2*R/c+DS)*(NZC/TSEQ))+gs$;

where R, c, DS, NZC, TSEQ, and gs are, respectively, the target cell radius, speed of light, target maximum delay spread, NB-PRACH sequence length, NB-PRACH sequence duration, and additional guard samples.

22. The apparatus of claim 18, in which the control circuitry is configured to establish an NB-PRACH configuration based on an NB-PRACH configuration index that is less than six bits in size and code-points of the NB-PRACH configuration index that indicate an NB-PRACH preamble format among multiple NB-PRACH preamble formats, and/or that indicate time resources available for NB-PRACH transmission.

23. The apparatus of claim 22, in which the time resources available for NB-PRACH transmission are based on an expression $k*f*10$ ms, where k and f are, respectively, an integer value greater than or equal to one, and a ratio of downlink (DL) to uplink (UL) subcarrier spacing.

24. Electronic device circuitry for a user equipment (UE) configured to use a narrowband (NB) bandwidth when performing random access of a cellular network associated with an evolved Node B (eNB) providing the NB bandwidth at a frequency band of a repurposed deployment using global systems for mobile communications (GSM) spectrum, an in-band deployment using a physical resource block (PRB) of a larger-bandwidth long term evolution (LTE) system, or a guard-band deployment using a guard band of the larger-bandwidth LTE system, the electronic device circuitry comprising:

control circuitry configured to generate an NB-physical random access channel (NB-PRACH) defined by an NB-PRACH physical structure and an NB-PRACH numerology;

the NB-PRACH physical structure including a cyclic prefix (CP), a guard time (GT), and an NB-PRACH sequence between the CP and the GT;

the NB-PRACH numerology configured to size components of the NB-PRACH physical structure such that a beginning of the CP and an end of the GT temporally correspond with a beginning and an end of one or more LTE subframes that each have a one millisecond (1 ms) duration, and the NB-PRACH numerology configured to maintain a number of subcarriers at a subcarrier spacing to establish the NB-PRACH as having an NB-PRACH bandwidth within the NB bandwidth; and the NB-PRACH includes a scheduling request (SR), and the control circuitry is configured to multiplex the NB-PRACH with the SR by frequency division multiplexing (FDM) such that the SR is configured for simultaneous transmission in an NB-physical uplink shared channel (NB-PUSCH) and/or an NB-physical uplink control channel (NB-PUCCH).

25. An apparatus of a user equipment (UE) for accessing a narrowband (NB)-long term evolution (LTE) network connection, the apparatus comprising:

control circuitry configured to generate an NB-physical random access channel (NB-PRACH) preamble and a scheduling request (SR), the NB-PRACH preamble being for transmission in an NB-PRACH and the SR being for transmission in a physical uplink (UL) channel having a frequency band that is different from that of the NB-PRACH, the NB-PRACH having a frequency bandwidth of up to 200 kilohertz (kHz) and a transmission time duration of one or more LTE transmission time intervals (TTIs); and the control circuitry further configured to multiplex the NB-PRACH and SR by frequency division multiplexing (FDM) for simultaneous transmission during the transmission time duration and through, respectively, the NB-PRACH and the physical UL channel, wherein the control circuitry is further configured to establish an NB-PRACH configuration based on an NB-PRACH configuration index that is less than six bits in size and code-points of the NB-PRACH configuration index that indicate an NB-PRACH preamble format among multiple NB-PRACH preamble formats, and/or that indicate time resources available for NB-PRACH transmission.

26. The apparatus of claim 25, in which the time resources available for NB-PRACH transmission are based on an expression k*f*10 ms, where k and f are, respectively, an integer value greater than or equal to one, and a ratio of downlink (DL) to uplink (UL) subcarrier spacing.

* * * * *

UNITED STATES PATENT AND TRADEMARK OFFICE
CERTIFICATE OF CORRECTION

PATENT NO. : 10,383,151 B2
APPLICATION NO. : 15/741283
DATED : August 13, 2019
INVENTOR(S) : Debdeep Chatterjee et al.

It is certified that error appears in the above-identified patent and that said Letters Patent is hereby corrected as shown below:

On the Title Page

Item (72), Column 1, Inventors:, Line 1, delete "Depdeep" and insert -- Debdeep --, therefor.

Signed and Sealed this
Eleventh Day of June, 2024

Katherine Kelly Vidal
*Director of the United States Patent and Trademark Office*